United States Patent [19]
Noda et al.

[11] Patent Number: 5,585,951
[45] Date of Patent: Dec. 17, 1996

[54] ACTIVE-MATRIX SUBSTRATE

[75] Inventors: Kazuhiro Noda, Kanagawa; Shinji Nakamua, Tokyo; Hisao Hayashi; Hisashi Kadota, both of Kanagawa, all of Japan

[73] Assignee: Sony Corporation, Tokyo, Japan

[21] Appl. No.: 172,644

[22] Filed: Dec. 23, 1993

[30] Foreign Application Priority Data

| Dec. 25, 1992 | [JP] | Japan | 4-359187 |
| Jun. 30, 1993 | [JP] | Japan | 5-189081 |
| Jul. 5, 1993 | [JP] | Japan | 5-191712 |
| Jul. 5, 1993 | [JP] | Japan | 5-191714 |

[51] Int. Cl.$^6$ .......................... G02F 1/1333; G02F 1/136
[52] U.S. Cl. ............................................. 349/122; 349/42
[58] Field of Search .................................. 359/59, 68, 74

[56] References Cited

U.S. PATENT DOCUMENTS

| 5,056,895 | 10/1991 | Kahn | 359/74 |
| 5,365,357 | 11/1994 | Ohgawara | 359/68 |
| 5,408,345 | 4/1995 | Mitsui | 359/59 |
| 5,419,991 | 5/1995 | Segawa | 430/20 |

FOREIGN PATENT DOCUMENTS

| 37911 | 1/1991 | Japan | 359/68 |
| 4220626 | 8/1992 | Japan | 359/87 |
| 4253028 | 9/1992 | Japan | 359/68 |

Primary Examiner—William L. Sikes
Assistant Examiner—Tiep H. Nguyen
Attorney, Agent, or Firm—Hill, Steadman & Simpson

[57] ABSTRACT

An active-matrix substrate has a layered structure in which an upper region including a plurality of pixel electrodes arranged in a matrix and a lower region including a plurality of thin film transistors for driving the individual pixel electrodes are overlapped on each other. A planarization layer is interposed between both of the substrates. An active-matrix liquid crystal display device includes a main substrate and a facing substrate which are disposed to face to each other at a specified interval. A liquid crystal layer having a specified thickness is held between both of the substrates. A device bus line area including a plurality of thin film transistor devices and bus lines is formed on the surface of the main substrate. A planarization layer is formed to embed the irregularities on the surface of the device bus line area. Pixel electrodes in a matrix are formed on the flat surface of the planarization layer. An interval dimension between the adjacent pixel electrodes is set to be larger than a thickness dimension B of the liquid crystal layer, so that the subsidiary lateral electric field is made smaller than the normal vertical electric field.

15 Claims, 42 Drawing Sheets

F I G. 19
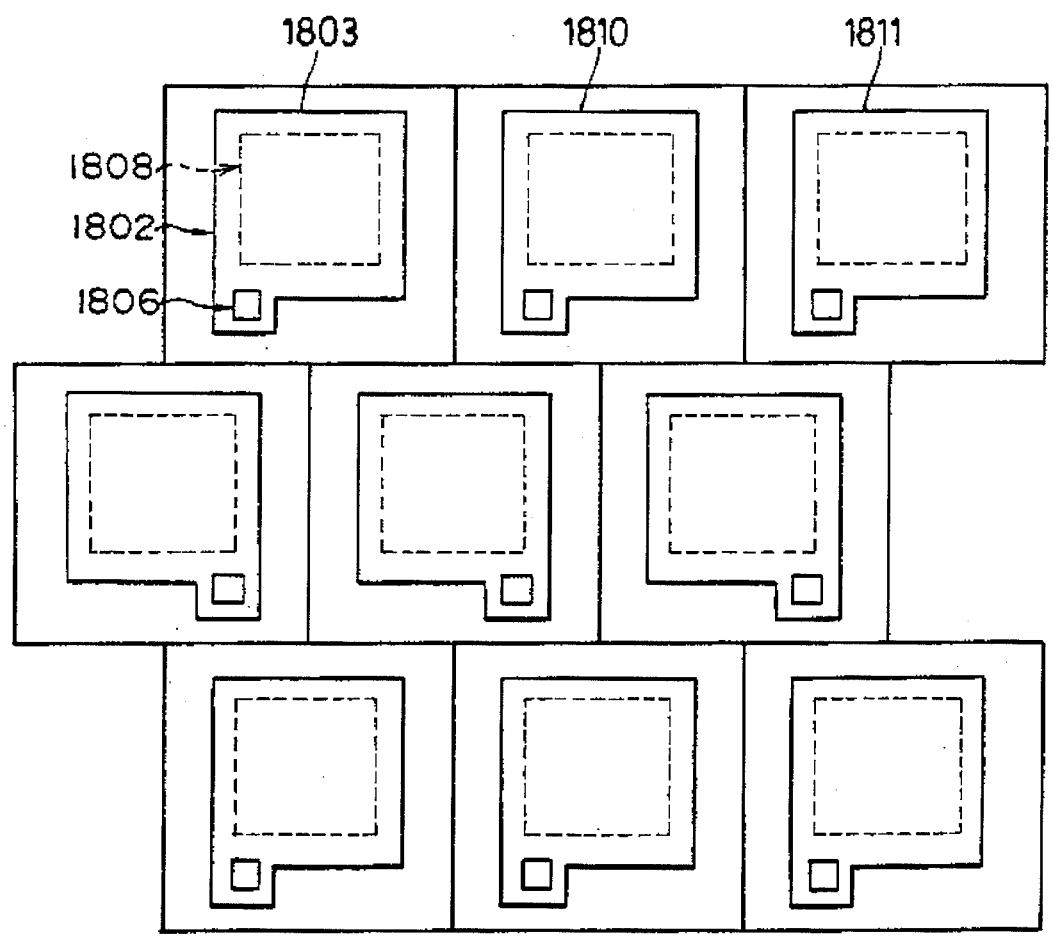

5,585,951

ACTIVE-MATRIX SUBSTRATE

BACKGROUND OF THE INVENTION

1. Field of the Invention

The present invention relates to an active-matrix liquid crystal display device, and particularly to a planarizing technique for an active-matrix substrate on which pixel electrodes and thin film transistors (TFT) for switching are integrally formed.

2. Description of the Related Art

A general construction of a prior art active-matrix liquid crystal display device will be briefly described with reference to FIG. 38. Each thin film transistor 3802 is integrally formed on the surface of a lower substrate 3810. A metal bus line pattern 3804 is electrically connected to a source region S of the thin film transistor 3802 through a first layer insulating film 3803. A pixel electrode 3806 is electrically connected to a drain region D of the thin film transistor 3802 through the first layer insulating film 3803 and a second layer insulating film 3805. The surface of the second layer insulating film 3805 is covered with an alignment film 3807. (Hereinafter, the lower substrate 3801 on which each thin film transistor 3802 and each pixel electrode 3806 are thus integrally formed is referred to as "active-matrix substrate" or "TFT substrate"). An upper substrate 3808 is disposed so as to face to the active-matrix substrate 3801 with a specified interval. A facing electrode 3809 and an alignment film 3810 are formed on the inner surface of the upper substrate 3808. (Hereinafter, such an upper facing substrate 3808 is referred to as "facing substrate"). A liquid crystal 3811 controlled in its alignment by the alignment films 3807 and 3810 is inserted in the interval between both the substrates 3801 and 3808. In the active-matrix liquid crystal display device having the above construction, when an image signal is supplied through the metal bus line pattern 3804 while a selection signal is applied to a gate electrode G of the thin film transistor 3802, a specified signal load is written on the pixel electrode 3806. The molecular alignment of the liquid crystal 3811 is changed depending on the voltage generated between the pixel electrode 3806 and the facing electrode 3810, to perform the desired image display.

Further, a general construction of a prior art active-matrix liquid crystal display device will be briefly described with reference to FIG. 41. The active-matrix liquid crystal display device has a cell structure including a pair of substrates 4101 and 4102 disposed so as to face to each other with a specified interval, and a liquid crystal layer 4103 held in the interval. One substrate 4101 is formed with pixel electrodes 4104 arranged in a matrix in the vertical and lateral directions, and switching devices connected to the individual pixel electrodes 4104. In this example, the switching devices are comprise thin film transistors (TFT). In each TFT, a drain electrode is connected to the corresponding pixel electrode 4104; a source electrode is connected to a signal line 4105; and a gate electrode is connected to a gate line 4106. (Hereinafter, the substrate 4101 having such a construction is referred to as "TFT substrate"). The other substrate 4102 includes a facing electrode 4107 for applying a vertical electric field to the liquid crystal layer 4103. In addition, the other substrate 4102 includes a color filter layer 4108. The color filter layer 4108 has segments divided into the primary colors, that is, red, green and blue. The segments are each matched with the pixel electrodes 4104. A pair of polarization plates 4109 and 4110 are stuck on both the surfaces of the cell structure.

The TFTs are selected in a line-sequential manner for each line through the gate line 4106, and an image signal is supplied to the TFTs through the signal line 4105, to perform the desired full color image display. The liquid crystal layer 4103 is, for example, in the twisted nematic alignment, so that the molecular alignment of the liquid crystal layer 4103 is changed in response to the vertical electric field applied between the facing electrode 4107 and each pixel electrode 4104. The change in the molecular alignment is taken off as the change in a transmitted light amount by a pair of the polarization plates 4109 and 4110, to thus perform the image display.

For the twisted nematic alignment of the liquid crystal layer 4103, the inner surfaces of a pair of the upper and lower substrates 4101 and 4102 must be subjected to an alignment treatment. The alignment treatment includes, for example, forming a specified alignment film and then rubbing the alignment film. FIG. 42 is a typical view showing the rubbing treatment. In this example, as shown in the figure, the inner surface of the lower TFT substrate 4101 is rubbed in the direction R, that is, bottom-to-top, while the inner surface of the facing substrate 4102 is rubbed in the direction R, that is, right-to-left. When a liquid crystal layer is sealingly inserted between a pair of the substrates 4101 and 4102 thus obtained, the liquid crystal molecules of the liquid crystal layer are twisted by 90°.

In the prior art structure shown in FIG. 38, wherein the thin film transistors 3802 and the metal bus line patterns 3804 are integrally formed on the active-matrix substrate 3801, the surface of the substrate 3801 is quite uneven, that is, has numerous irregularities and stepped portions. This makes it difficult to perform the alignment control for the liquid crystal 3811 and to obtain the uniform image display. The alignment of the liquid crystal is disturbed particularly in the stepped portions, which tends to cause the reverse tilt domain where the pretilt angle is reversed, thereby deteriorating the display quality. For shielding the region disturbed in the alignment, there has been known a technique of forming a black mask on the facing substrate side. The black mask is usually provided so as to be overlapped on the end portion of the pixel electrode liable to be disturbed in the alignment, thus sacrificing the effective display region. As a result, in aiming at enhancing the density of the pixel electrodes arranged in a matrix by reduction of the arrangement pitch thereof, the aperture ratio is lowered because the width of the black mask pattern cannot be reduced. Further, along with the reduction of the pixel pitch and the miniaturization of the chip size, the prior art structure has the following various disadvantages in terms of the manufacturing processes. For example, the thickness of the alignment film becomes uneven because of the large irregularities on the surface of the active-matrix substrate. This makes also difficult the uniform rubbing treatment for the alignment film. Further, when the active-matrix substrate is adhesively bonded with the facing substrate, there occurs a fault in adhesiveness because of the irregularities. Additionally, in the prior art structure, the direction of the electric field applied to the liquid crystal is made uneven by the effect of the irregularities on the surface of the active-matrix substrate, which obstructs the control to obtain uniform transmissivity. The liquid crystal is changed in its alignment depending on the electric field applied between each pixel electrode and the facing electrode, to be thus ON-OFF controlled. However, when the metal bus line and the gate line are raised around the pixel electrodes, the liquid crystal is affected by the lateral electric field. This disturbs the normal action by the synergistic effect with the disorder of the pretilt angle.

Along with the strong demands toward the fineness and accuracy in the active-matrix liquid crystal display device, the pixel pitch has been made small. To meet the above demands, it is required to enlarge the area of the pixel electrode as much as possible for ensuring the desired aperture ratio. Consequently, the interval between the adjacent pixel electrodes becomes smaller. In the extreme case, the interval between the adjacent pixel electrodes is made smaller than the interval between each pixel electrode and the facing electrode, so that the liquid crystal is occasionally affected by the subsidiary lateral electric field generated between the adjacent pixel electrodes larger than the normal vertical electric field applied between each pixel electrode and the facing electrode. In fact, the prior art structure has the following disadvantages: namely, by the effect of the lateral electric field, the reverse tilt domain is generated in the liquid crystal layer; and the light fallout is generated because the liquid crystal molecules are not correctly raised, resulting in the poor image quality.

FIG. 39 is a sectional view showing the construction of a prior art active-matrix liquid crystal display device. In this prior art structure, a pixel electrode 3906 is provided on a recessed portion surrounded by bus lines 3904 or the like arranged in a matrix. Accordingly, liquid crystal pixels are separated from each other. However, as the arrangement pitch is made fine along with the demands toward the high accuracy and fineness of the liquid crystal display device, the alignment defect of the liquid crystal 3903 is generated by the irregularities on the surface of the substrate. For example, when the substrate 3901 is rubbed in the direction of the arrow, liquid crystal molecules 3908 in the upper area of the pixel electrode 3906 have a specified pretilt angle, that is, are in the normal tilt state. In the areas near the tilt surfaces 3909 being the shady sides in the rubbing direction, the liquid crystal molecules 3908 are raised in the direction opposed to the normal tilt state, and are thus in the reverse tilt state. Consequently, a disclination is generated at the boundary between both the states, which deteriorates the display quality.

FIG. 40 is a typical view of the prior art structure shown in FIG. 39. As described above, since each pixel electrode 3906 is formed on a recessed portion surrounded by bus lines 3904, adjacent liquid crystal pixels are structurally separated from each other. However, it is difficult to apply the uniform rubbing treatment for the surface having the significant irregularities. In particular, as the arrangement pitch of the pixel electrodes is made fine along with the demands toward high accuracy and high fineness of the display device, the irregularities on the surface of the substrate is made relatively significant, tending to often cause the alignment defect.

Various means have been proposed to prevent the generation of the reverse tilt state. For example, Japanese Patent Laid-open No. HEI 4-305625 discloses a technique of forming grooves on a substrate for embedding thin film transistors and bus lines therein, thereby reducing the irregularities on the surface. Further, Japanese Patent Laid-open No. HEI 4-320212 discloses a technique of forming grooves in a layer insulating film for preventing the enlargement of the reverse tilt state. These techniques, however, fail to perfectly prevent the reverse tilt state.

FIG. 43 is a typical plan view of a TFT substrate. As shown in the figure, individual pixel electrodes are arranged in a matrix. They are repeatedly arranged in order of red, blue and green along the line direction. On the other hand, they are not linearly arranged in a row direction, and are shifted to each other by a half pitch in the lateral direction. As a result, the adjacent red, green and blue pixels are arranged in a triangular shape, that is, are in the delta arrangement, thus apparently improving the resolution. Each pixel electrode 4301 has an asymmetric shape in the right and left, and is provided with a portion to be matched with a contact hole C of a TFT (not shown).

In the liquid crystal display device, there is generally performed an A.C reverse drive, for example, the so-called 1H drive wherein the polarity of a signal voltage applied to pixel electrodes is reversed for each line. When the raster display is made by a 1H drive, for example, the center level of the signal voltage + the maximum signal voltage are applied to pixel electrodes in the first line; and the center level of the signal voltage–the maximum signal voltage are applied to pixel electrodes in the second line. Accordingly, a large potential difference $\Delta V$ is generated between the vertically adjacent pixel electrodes 4301, which is twice as much as the maximum signal voltage. As the arrangement pitch between the pixel electrodes is made fine along with the demands toward the high accuracy and high fineness of the active-matrix liquid crystal display device, a lateral electric field intensity generated due to the above potential difference $\Delta V$ cannot be neglected as compared with the vertical electric field intensity generated between the facing electric electrode and the pixel electrodes. In addition, the lateral electric field is generated in the plane direction of the figure, and the vertical electric field is generated in the direction vertical to the figure (in the thickness direction of the liquid crystal).

In the delta arrangement shown in FIG. 43, each pixel electrode 4301 has an asymmetric shape in the right and the left. Accordingly, between the pixel electrode in the first and second lines, the lateral electric field intensity is maximized at a region A, and minimized at a region B. Because of the unbalance of the lateral electric field intensities between the regions A and B, the liquid crystal molecules positioned on the lower portion of the pixel electrode in the first line are applied with a force F directed from the right to the left. On the other hand, as for the lateral electric field generated between the pixel electrodes generated in the second and the third lines, the above strong region A becomes weak, and the above weak region B becomes strong. Accordingly, the liquid crystal molecules positioned on the lower portion of the pixel electrodes in the second line is applied with a force F directed from the left to the right.

On the other hand, as described above with reference to FIG. 42, when the TFT substrate is rubbed in the direction R from the bottom to the top and the facing substrate is rubbed in the direction R from the right to the left, the rotational direction T of the liquid crystal molecules M becomes clockwise as seen from the facing substrate side in FIG. 43. In the first line, the liquid crystal molecules M are applied with the force F in the direction reversed to the rotational direction T, so that they tend to be rotated in the reversed direction against the dominating force of the vertical electric field, thus enlarging the so-called reverse tilt domain. On the other hand, in the second line, the liquid crystal molecules M are applied with a force F in the direction similar to the rotational direction T, so that they are raised rapidly in the normal direction, thus reducing the reverse tilt domain. As is apparent from the above description, for the pixel electrode having an asymmetric shape in the right and the left, by actually performing the 1H drive, the magnitudes of the reverse tilt domains become different.

FIG. 44 is a sectional view taken along the line Y—Y of the active-matrix liquid crystal display device of FIG. 43. From the left to the right in the figure, there are shown part of a pixel electrode in the first line, a pixel electrode in the second line, and part of a pixel electrode in the third line. As described above, a large reverse tilt domain region LRTD is generated between pixel electrodes in the first and second lines, and only a small reverse tilt domain region SRTD is generated between pixel electrodes in the second and the third lines. Since the reverse tilt domain regions reduce the display quality, they are generally shielded by black masks. As shown in the figure, a black mask 4411 is provided, for example, on the inner surface of a facing substrate 4402. The plane dimension of the black mask 4411 must be set to shield the large reverse tilt domain region LRTD. Accordingly, in the case that the reverse tilt domains are varied for each line due to the laterally asymmetric shape of each pixel electrode just as the prior art, the dimension of the black mask 4407 must be necessarily enlarged. This causes the disadvantage of sacrificing the aperture ratio of the active-matrix liquid crystal display device.

SUMMARY OF THE INVENTION

Accordingly, a first object of the present invention is to equalize the alignment control of an active-matrix liquid crystal display device, and to improve an aperture ratio of an active-matrix liquid crystal display device. To achieve the above object, the following has been provided. Namely, according to the present invention, there is provided an active-matrix substrate having a layered structure in which an upper region including a plurality of pixel electrodes arranged in a matrix and a lower region including a plurality of thin film transistors for driving the individual pixel electrodes are overlapped on each other, wherein a planarization layer is interposed between both of the substrates. The above planarization layer is composed of a transparent resin film having a thickness sufficient to embed and planarize the surface of the lower region.

The active-matrix substrate thus planarized is manufactured by a method comprising: a first process of integrally forming a first region including a plurality of thin film transistors on a substrate; a second process of embedding and planarizing the irregularities on the surface of the first region with a planarization layer; and a third process of forming a second region where a plurality of pixel electrodes are arranged in a matrix on the flat surface of the planarization layer. The above second process includes the step of coating a liquid transparent resin and hardening it. This manufacturing method includes the connecting step of electrically connecting the upper pixel electrodes with the lower pixel electrodes by way of a contact hole through the planarization layer. The above connecting step includes the step of applying photolithography and etching to the planarization layer made from photosensitive resin for perforating the contact hole.

The active-matrix liquid crystal display device of the present invention basically includes a TFT substrate and a facing substrate which are disposed to face each other with a specified interval, and a liquid crystal inserted in the interval. The present invention has a feature in that the TFT substrate has a first region including a plurality of thin film transistors; a planarization layer for embedding the irregularities on the surface of the first region; a second region including pixel electrodes in a matrix formed on the flat surface of the planarization layer, which are connected to the first region; and an alignment layer for covering the second region for performing the alignment control of the liquid crystal.

A second object of the present invention is to prevent the adverse effect of a generated lateral electric field from enhancing the accuracy and fineness of pixel electrodes, and hence to keep the high image quality. To achieve the above object, the following has been provided. Namely, according to the present invention, there is provided an active-matrix liquid crystal display device including a main substrate and a facing substrate which are disposed to face to each other with a specified interval, and a liquid crystal having a specified thickness which is held between both the substrates. The above main substrate includes a device bus line area including a plurality of thin film transistors and bus lines; a planarization layer for embedding the irregularities on the surface of the device bus line area; and pixel electrodes in a matrix formed on the flat surface of the planarization layer. With this construction, an interval dimension between the adjacent pixel electrodes is set to be larger than a thickness dimension of the liquid crystal layer. Preferably, the planarization layer comprises a transparent resin film.

A third object of the present invention is to provide a liquid crystal pixel separating structure capable of enhancing the accuracy and fineness of an active-matrix liquid crystal display device. To achieve the above object, the following has been provided. Namely, according to the present invention, there is provided a cell structure composed of a pair of substrates disposed to face to each other with a specified interval and a liquid crystal held between both of the substrates. One substrate includes a region where thin film transistors and bus lines are formed; an insulating layer with a relatively flat surface which is formed on the above region; and pixel electrodes in a matrix formed on the insulating film. The other substrate includes a facing electrode, to provide the liquid crystal pixels with individual pixel electrodes. With this construction, separation recessed grooves are formed on the flat surface of the insulating film along the surroundings of the pixel electrode, to functionally separate the adjacent pixel electrodes from each other. The insulating film is, for example, a planarization film made from a resin material. Alternatively, the insulating film is a layer insulating film for electrically separating the bus line from the pixel electrode.

A fourth object of the present invention is to equalize the lateral electric field applied between the adjacent upper and lower pixel electrodes of an active-matrix liquid crystal display device, and to suppress the variation in the reverse tilt domains. To achieve the above object, the following has been provided. Namely, according to the present invention, there is provided a cell structure composed of a pair of substrates disposed to face each other with a specified interval and a liquid crystal layer held in the interval. One substrate includes pixel electrodes arranged in a matrix in the vertical and lateral directions, and switching devices connected to the individual pixel electrodes. The other substrate includes a facing electrode for applying the vertical electric field to the liquid crystal layer. By vertically selecting each switching device in each line in a line sequential manner and by supplying an image signal to the switching device in each line, the image display is performed. With this construction, the individual pixel electrodes have a symmetrical shape to the right and to the left, to equalize the lateral electric fields generated between the pixel electrodes spaced in the vertical direction. Preferably, the above pixel electrode is formed on the planarization film.

BRIEF DESCRIPTION OF THE DRAWINGS

FIG. 19 is a plan view of FIG. 18;

DETAILED DESCRIPTION OF THE PREFERRED EMBODIMENTS

Hereinafter, various embodiments of the inventive device will be described in conjunction with the drawings.

Figure 1:
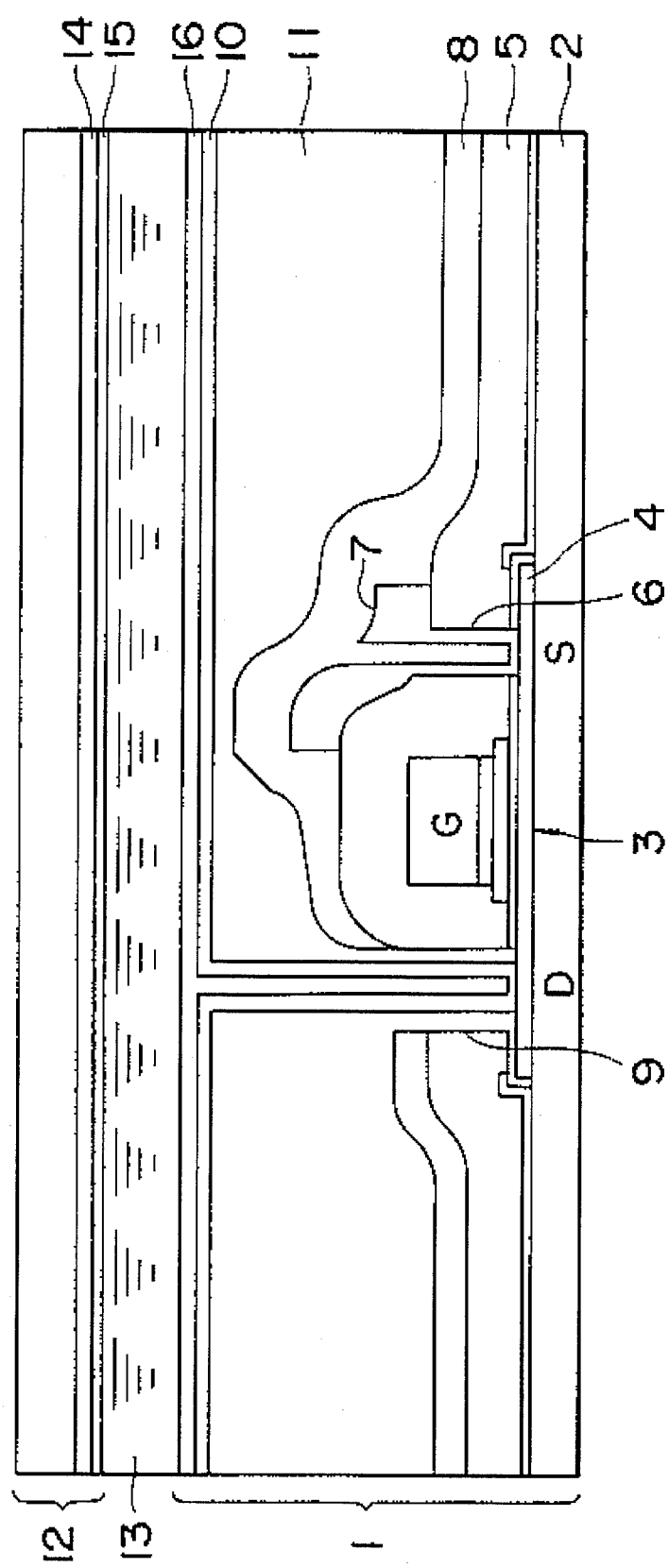
FIG. 1 is a sectional view showing the basic construction of an active-matrix substrate according to the present invention.

FIG. 1 is a sectional view showing a basic construction of an active-matrix substrate of the present invention. As shown in this figure, an active-matrix substrate 1 includes an insulating substrate 2 made from a quartz glass or the like, on the surface of which thin film transistors (TFT) are integrally formed. The TFTs use a semiconducting thin film 4 formed by patterning in a dotted pattern as active areas. The semiconducting thin film 4 is made from, for example a first polysilicon (hereinafter referred to as "1 poly"). In addition, the present invention is not limited to the 1 Poly, and may include a single crystalline silicon and an amorphous silicon. A gate electrode G is formed by patterning on the semiconducting thin film 4 through three layers of gate insulating films. The gate electrode G is made from, for example a second polysilicon (hereinafter, referred to as "2 poly"). A metal bus line pattern 7 is electrically connected to a source region S of the TFT 3 through a first contact hole 6 provided on a first layer insulating film 5. The first layer insulating film 5 is made from, for example a glass doped with phosphorous, which is referred to as "1 PSG" hereinafter. The metal bus line pattern 7 is made from, for example aluminum, which forms an image signal line and the like. On the other hand, a pixel electrode 10 is electrically connected to a drain region D of the TFT 3 by way of a second contact hole 9 provided through the first layer insulating film 5 and a second layer insulating film 8. The second layer insulating film 8 is formed in such a manner as to cover the metal bus line pattern 7 and is similarly made from a glass doped with phosphorous, which is referred to as "2 PSG" hereinafter.

The feature of the present invention lies in that a planarization layer 11 is interposed between the second layer insulating film 8 and the pixel electrode 10. The planarization layer 11 has a thickness enough to embed and planarize the irregularities of the TFT 3 and the metal bus line pattern 7. Accordingly, the surface of the planarization layer 11 is substantially in a perfect flattened state, on which the pixel electrode 10 is formed by patterning. As a consequence, there exists no irregularity in the level of the pixel electrode 10.

Each electrode 10 is electrically connected to the semiconducting thin film 4 of the corresponding thin film transistor 3 by way of the second contact hole 9 provided through the planarization layer 11. The inner peripheral wall of the contact hole 9 is covered with the planarization layer 11. The planarization layer 11 may be removed from the bottom portion of the contact hole 9. Further, the end surface of the planarization layer may be exposed on the inner peripheral wall of the contact hole 9. Additionally, the black mask pattern may be integrally formed so as to be matched with the boundary between the pixel electrodes arranged in a matrix. The black mask pattern may make use of the metal bus line pattern formed on the lower region. A color filter layer may be integrally formed. This color filter layer is formed of part of the planarization layer colored in compliance with each pixel electrode. Preferably, a shading film is formed on or under the planarization layer so as to shield the thin film transistor.

According to the above-described embodiment, there is used a planarization layer made from a transparent resin for embedding the irregularities on the surface of the lower region or the first region including a plurality of the thin film transistors. The upper region or the second region including the pixel electrodes in a matrix are formed on the flat surface of the planarization layer. Further, the alignment layer is provided to cover the pixel electrodes in a matrix. Accordingly, the alignment layer has the substantially flat surface and is not affected by the stepped portion, which makes it possible to reduce the reverse tilt domain. Further, since there exists no rising portion around the pixel electrodes, the liquid crystal can be stably ON-OFF controlled without any effect of the lateral electric field. Additionally, the black mask and the full color filter are integrally formed on the active-matrix substrate using the planarization layer. As a result, the alignment error is neglected, and the effective display portion of the pixel electrodes can be enlarged more than that in the prior art, which leads to the improvement in the aperture ratio.

The planarization layer 11 is generally required to be colorless and transparent. Since the second contact hole 9 is provided on the planarization layer 11, the planarization layer 11 must be possible in the fine processing. The planarization layer 11 requires the specified chemical resistance because chemicals are used for etching of the pixel electrodes 10, and further, requires the specified heat resistance because it is exposed in high temperatures in the subsequent processes. To meet the above requirements, the planarization layer 11 is suitably selected from the specified organic materials and inorganic materials. As the organic materials, for example, an acrylic resin or a polyimide resin may be used. Polyimide resin is excellent in heat resistance; but is slightly colored. On the contrary, acrylic resin is substantially colorless and transparent. These resins are each applied by a spin coat method or a transfer method. As the inorganic materials, for example, an inorganic glass mainly containing silicon dioxide may be used. In this embodiment, there is used an acrylic resin having a specified viscosity and thus being excellent in embedding the irregularities. As described above, the present invention has a feature in that the planarization layer 11 is interposed between the lower region or the first region including the TFTs 3 integrally formed and the metal bus line pattern 7, and the upper region or the second region including the pixel electrodes 10 arranged in a matrix. Each pixel electrode 10 is electrically connected to the semiconducting thin film 4 of the corresponding TFT 3 by way of the second contact hole 9 provided through the planarization layer 11.

A liquid crystal display device can be constituted of the active-matrix substrate 1 having the above construction. As shown in FIG. 1, the liquid crystal display device is so constructed that, the liquid crystal 13 is inserted between the active-matrix substrate 1 and a facing electrode 12 which are disposed so as to face to each other with a specified interval. A facing electrode 14 and an alignment film 15 are formed on the inner surface of the facing substrate 12. An alignment film 16 is also formed on the surface of the active-matrix substrate 1. By use of a pair of the alignment films 15 and 16, the alignment control of the liquid crystal 13 is performed, to thus form, for example, a twist nematic mode. Differently from the prior art structure, the alignment film 16 has a quite flat surface, that is, has not any stepped portion, thus enabling the uniform rubbing treatment. This enables the uniform control in alignment over the whole screen. Further, because of the absence of the rising portion around the pixel electrodes 10, the liquid crystal 13 can be perfectly controlled and driven by the vertical electric field applied between the facing electrode 14 and the pixel electrodes 10. Namely, it is never affected by the lateral electric field. This makes it possible to effectively improve the deterioration of the display quality due to the reverse tilt domain which has been at stake in the prior art. Moreover, the facing substrate 12 can be adhesively bonded on the active-matrix substrate 1 with high accuracy, to prevent the leakage of the liquid crystal from the seal portion.

A fabrication method for the active-matrix substrate shown in FIG. 1 will be fully described below with reference to FIGS. 2A to 2G. First, in a process A in FIG. 2, a 1 poly 21 is formed on the surface of an insulating substrate made from quartz or the like by an LPCVD method. The 1 poly 21 is once refined by a Si ion implantation, and is subjected to solid-phase growth to enlarge the particle size of the 1 poly 21. The 1 poly 21 is then subjected to patterning in a dotted pattern, to form each active region. The surface of the active region is thermally oxidized, to form a $SiO_2$ film, thus obtaining a gate oxide film. Boron ions are implanted with a specified concentration, to previously adjust the threshold voltage. In addition, while being not shown in the figure, the 1 poly 21 is subjected to patterning to form an auxiliary capacity. Next, in a process B, an SiN 24 is formed by the LPCVD method to form a gate nitride film. The surface of the SiN 24 is thermally oxidized to be transformed into an $SiO_2$. A gate insulating film formed of a three-layer structure of $SiO_2/SiN/SiO_2$ and which is excellent in withstand pressure can be thus obtained. A 2 poly 25 is deposited by the LPCVD method. The 2 poly 25 is processed to be lowered in resistance, and is then subjected to patterning in a specified shape, to thus obtain a gate electrode. Subsequently, As ions are implanted by self-alignment with the gate electrode as a mask to obtain the so-called LDD structure. Then, the SiN 24 is partially removed by etching, after which As ions are implanted with a high concentration, to form a souse region S and a drain region D in the 1 poly 21. An N-channel TFT 26 is thus formed. In addition, to form a P-channel TFT, boron ions may be implanted. In a process D, a 1 PSG 27 is deposited by an APCVD method. A first contact hole (1CON) 29 is formed by patterning on the 1 PSG 27, and then an aluminum (Al) 28 is formed over the surface by sputtering. The aluminum (Al) 28 is subjected to patterning in a specified shape, to form a metal bus line pattern electrically connected to the source region S of the TFT 26.

Figure 2A:
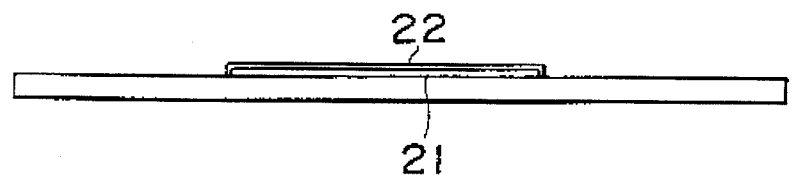
FIGS. 2A to 2G are process diagrams showing a manufacturing method for the active-matrix substrate shown in FIG. 1.
Figure 2B:
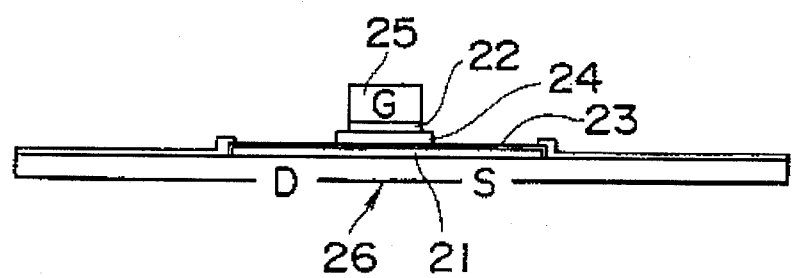
Figure 2C:
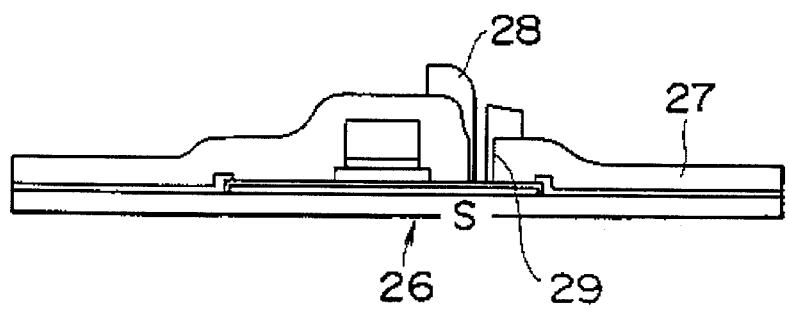
Figure 2D:
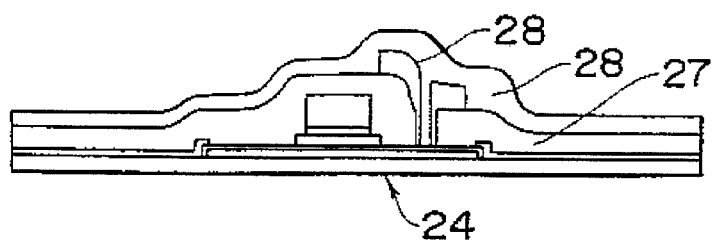
Figure 2E:
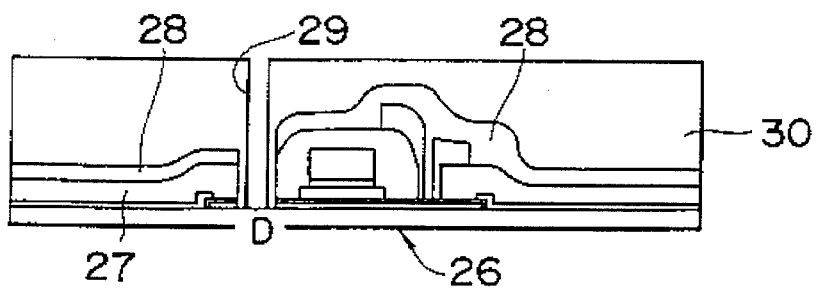
Figure 2F:
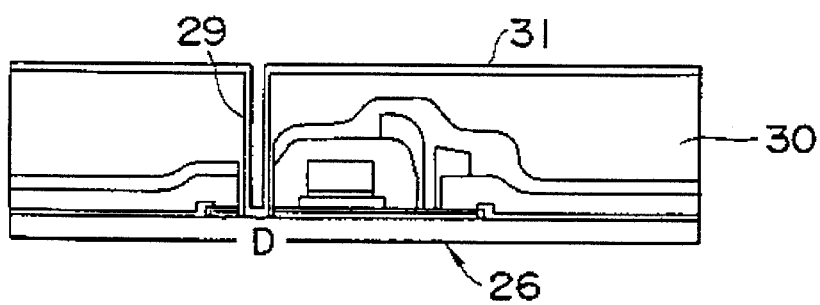
Figure 2G:
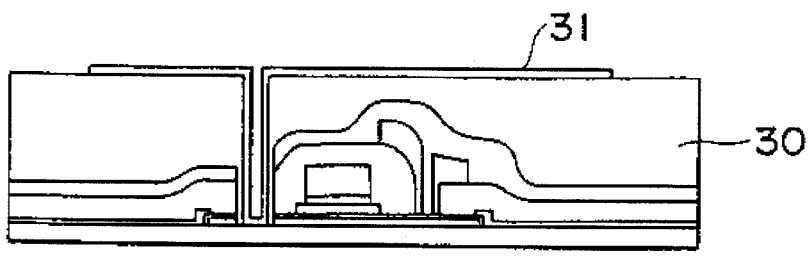

In FIG. 2D, a 2PSG is deposited to be overlapped on the 1 PSG 27 by the APCVD method in such a manner as perfectly cover the bus line metal pattern made from the Al 28. In a process E, the irregularities on the surface of the 2PSG 28 are is embedded by a planarization layer. Specifically, a liquid acrylic resin having a specified viscosity is applied by spin coating in this embodiment, after which the acrylic resin is hardened by heating, to form a planarization layer 30. The hardened planarization layer 30 is subjected to photolithography and etching, to form a second contact hole (2CON) 29. The drain region D of the TFT is exposed from the bottom portion of the 2CON 29. The examples for forming the 2CON 29 passing through the planarization layer 30, 2PSG 28 and 1 PSG 27 will be fully described later. In a process F, a transparent conductive film 31 is formed by sputtering. In this embodiment, an ITO is used as the transparent conductive film. The interior of the 2CON 29 is also filled with the ITO 31, to be electrically connected to the drain region D of the TFT 26. Finally, in a process G, the ITO 31 is subjected to patterning in a specified shape, to form pixel electrodes. The planarized active-matrix substrate can be thus obtained.

The examples of forming a second contact hole (2CON) 31 will be described with reference to FIGS. 3A to 3C. The 2CON 31 is provided to electrically connect an ITO 32 forming pixel electrodes to a 1 poly 35 forming thin film transistors through a planarization layer 33, which is one of the important elements of the present invention. A first example shown in FIG. 3A has a feature in that the inner peripheral wall of the second contact hole 2CON 31 is covered with the planarization layer 33. To obtain the above structure, the layer of a (1PSG+2PSG) 34 is perforated in a large aperture, followed by coating of the planarization film 33, and is perforated in a small aperture. In such a structure, the side etching of the (1PSG+2PSG) 34 and the overhang of the planarization film 33 can be prevented, thereby eliminating a fear of causing defects such as stepped cutout in the ITO 32.

Figure 3A:
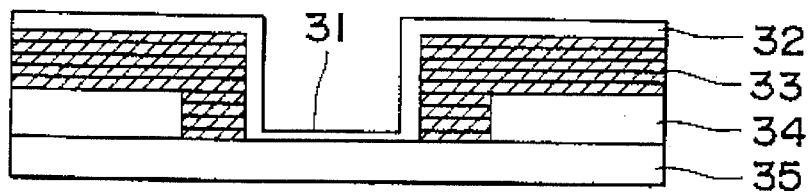
FIGS. 3A to 3C are typical views showing construction examples of a second contact hole provided on the active-matrix substrate.
Figure 3B:
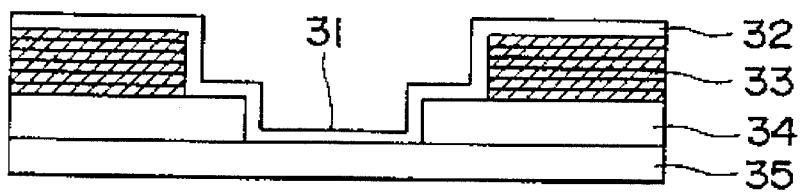

A second example shown in FIG. 3B has a feature in that the planarization film 33 is removed from the bottom portion of the 2CON 31. To obtain such a structure, the planarization film 33 is perforated in a large aperture, and then the (1PSG+2PSG) 34 is perforated in a small aperture. Since the planarization film 33 is not directly contacted with the 1 poly 35, the contamination to the TFT portion can be reduced. Since the residue of the planarization film 33 doe not remain on the 1 poly 35, the adverse effect on the contact resistance is made small. Further, this example is advantageous in use of the existing process at maximum.

Figure 3C:
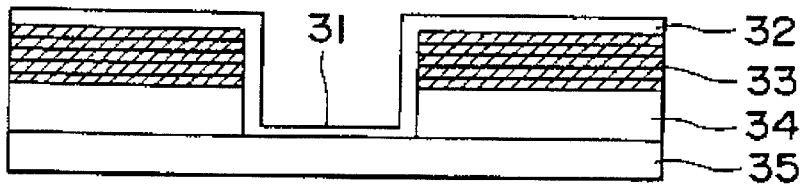

A third example shown in FIG. 3C has a feature in that the end surface of the planarization film is exposed from the inner peripheral wall of the 2CON 31. To obtain such a structure, the planarization film 33 and the (1PSG+2PSG) 34 are subjected to batch-etching or etching by self-alignment. Accordingly, this example has an advantage in simplifying the processes. However, when the side etching is generated on the layer of the (1PSG+2PSG) 34, there is a fear of causing defects such as the stepped cutout in the ITO 32.

Figure 4A:
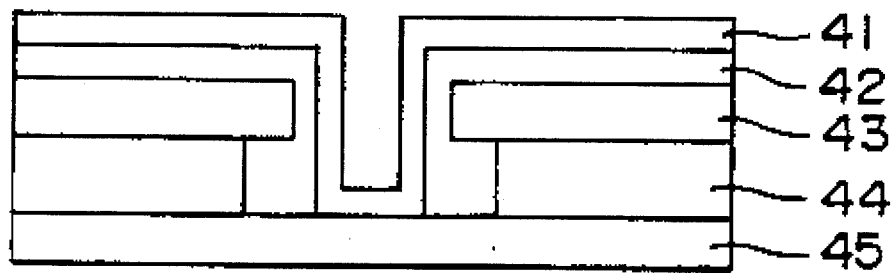
FIGS. 4A to 4B are typical views showing a construction example of the contact-hole.
Figure 4B:
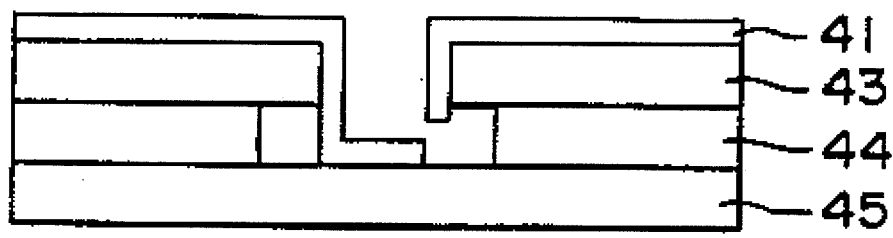
Figure 5A:
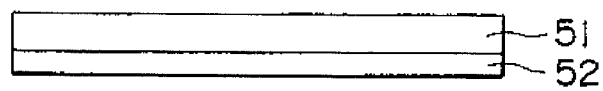
FIGS. 5A to 5F are process diagrams showing a forming method for the contact hole shown in FIGS. 3A to 3C.
Figure 5B:
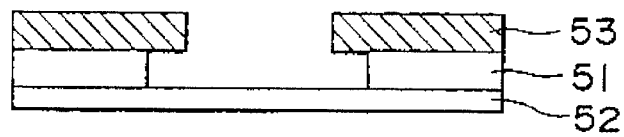
Figure 5C:
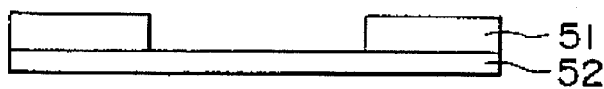
Figure 5D:
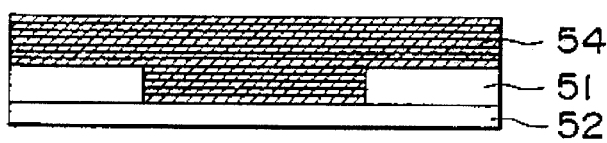
Figure 5E:
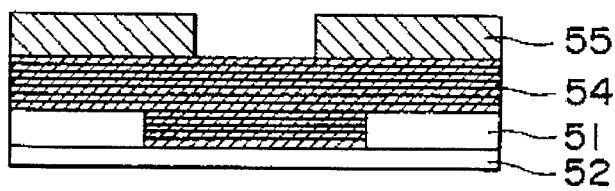
Figure 5F:
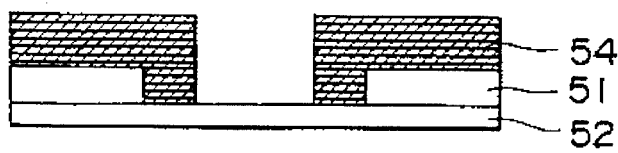
Figure 6A:
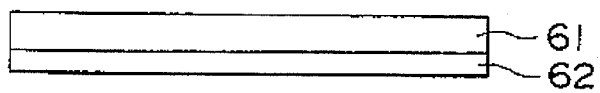
FIGS. 6A to 6E are process diagrams showing the forming method for the contact hole.
Figure 6B:
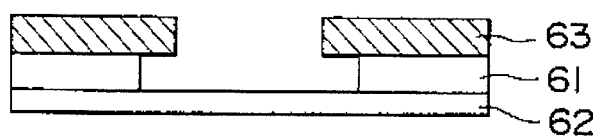
Figure 6C:
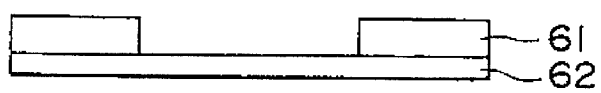
Figure 6D:
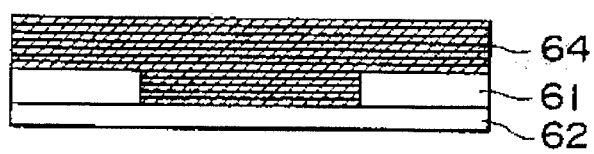
Figure 6E:
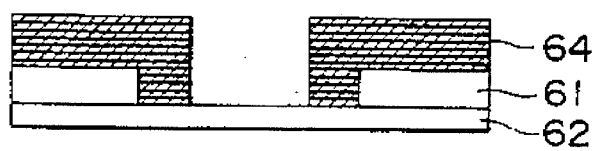
Figure 7A:
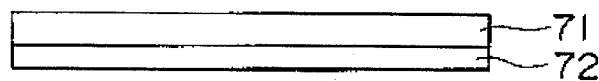
FIGS. 7A to 7F are process diagrams showing the forming method for the contact hole.
Figure 7B:
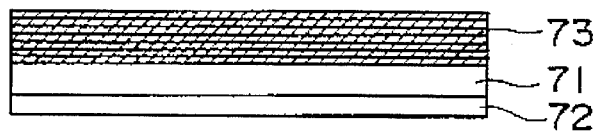
Figure 7C:
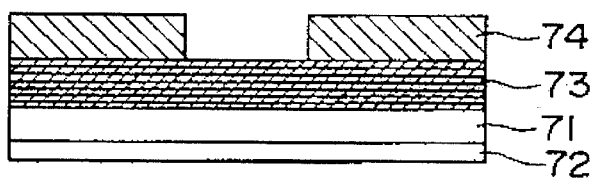
Figure 7D:
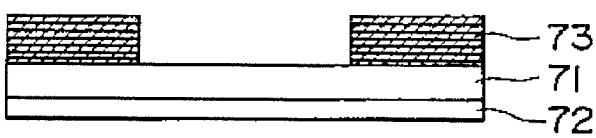
Figure 7E:
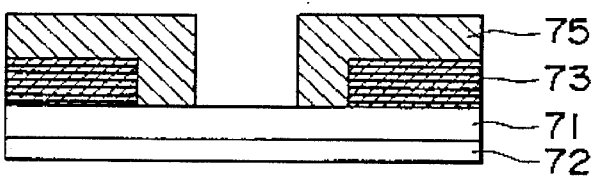
Figure 7F:
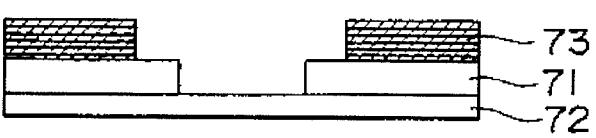
Figure 8A:
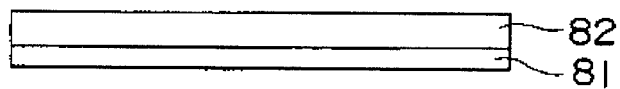
FIGS. 8A to 8E are process diagrams showing the forming method for the contact hole.
Figure 8B:
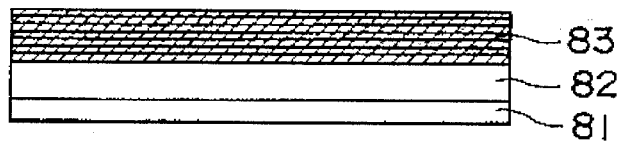
Figure 8C:
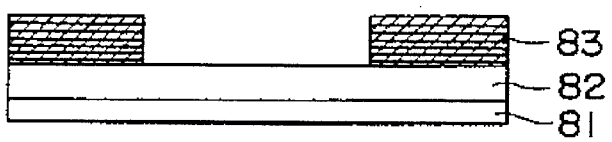
Figure 8D:
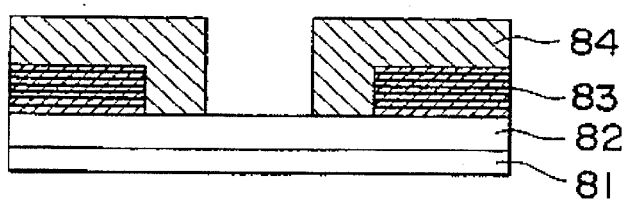
Figure 8E:
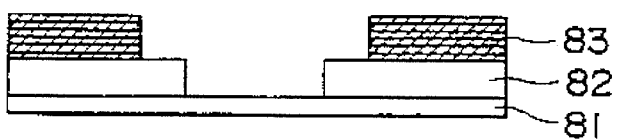
Figure 9A:
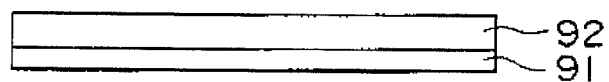
FIGS. 9A to 9E are process diagrams showing the forming method for the contact hole.
Figure 9B:
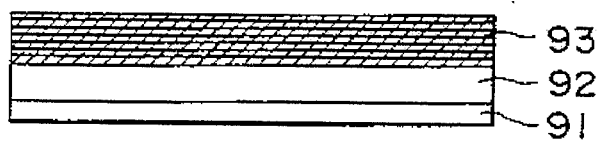
Figure 9C:
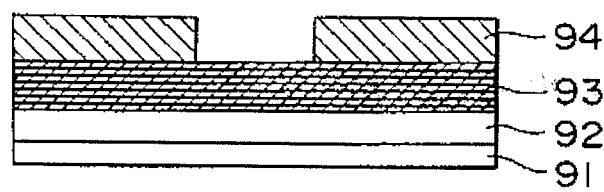
Figure 9D:
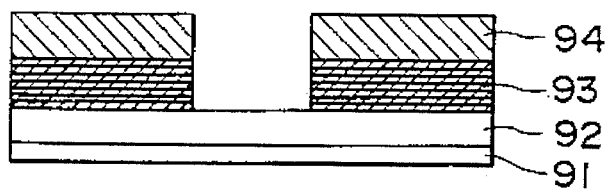
Figure 9E:
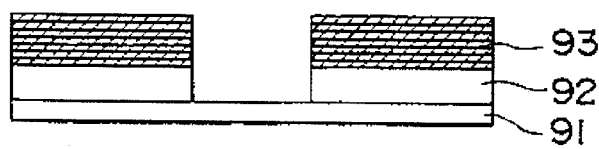
Figure 10A:
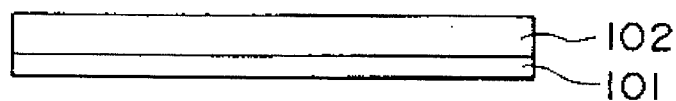
FIGS. 10A to 10D are process diagrams showing the forming method for the contact hole.
Figure 10B:
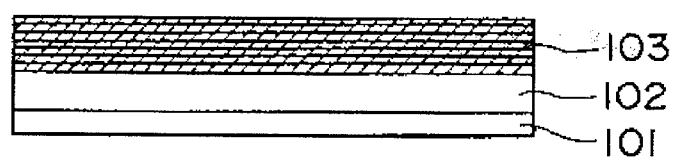
Figure 10C:
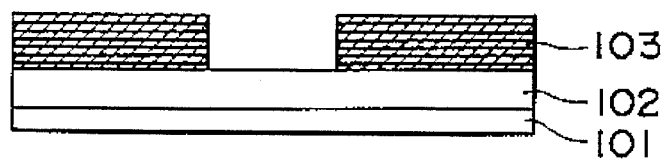
Figure 10D:
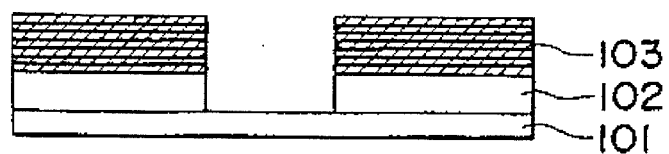

FIGS. 4A and 4B are typical views showing the application of the first example shown in FIG. 3A. As shown in FIG. 4A, in this application an upper electrode film 41 is electrically contacted with a lower semiconducting layer 45 by way of a contact hole provided through a first insulating film 43 and a second insulating film 44. In this application, the first and second insulating films 41 and 45 are different in material from each other, and the etching rate for the former is smaller than that of the latter. Accordingly, when the etching is performed for forming the contact hole, the side etching is emerged on the second insulating film 44. For embedding this side etching, the contact hole is filled with a planarization film 42. After that, the planarization film 42 is etched with a relatively small aperture diameter, to expose the surface of the semiconducting layer. Subsequently, the electrode film 41 is formed, to be electrically connected to the semiconducting layer 45 in the contact hole. As is apparent from the figure, since the side etching portion of the second insulating film 44 is perfectly covered with the planarization film 42, any stepped portion is not generated on the inner wall of the contact hole, thereby eliminating the fear of causing defects such as a stepped cutout on the electrode film 41.

On the contrary, in the comparative example shown in FIG. 4B, the electrode film 41 is directly formed along the inner wall of the contact hole in such a state that the side etching is generated on the second insulating film 44. At this time, defects such as stepped cutout tend to be often generated on the electrode film 41.

A method for forming the first example of the contact hole shown in FIG. 3 will be described with reference to FIGS. 5A to 5F. In this example, as the planarization film, a non-photosensitive resin is used. The non-photosensitive resin does not contain any photosensitive radical, so that it has excellent transparency and chemical stability; however, it is slightly poor in processing performance and is thus complicated in the processes. In a process A, the PSG 51 is formed on the surface of a Poly 52. In a process B, a resist 53 is coated, and is subjected to exposure and development. After light ashing, the PSG 51 is etched with the resist 53 as a mask. At this time, the side etching is generated, and the aperture diameter of the PSG 51 is slightly enlarged. In a process C, the resist 53 is removed. In a process D, the non-photosensitive resin is coated and baked, and the aperture is embedded by a planarization film 54. Finally, in a process F, the planarization film 54 is etched through a resist 55, to expose the surface of the Poly 52. The planarization film 54 is removed by dry etching such as plasma etching. Then, after the removal of the resist 55, the baking of the planarization film 54 is performed.

A method for forming the first example of the contact hole shown in FIG. 3A will be similarly described with reference to FIGS. 6A to 6E. In this method, a planarization film is made from a photosensitive resin in place of the above non-photosensitive resin. The process can be simplified by use of the photosensitive resin. Since a contact hole is formed only by a photolithography process, the uniformity within the surface is extremely excellent. In a process A, a PSG 61 is formed on a Poly 62. In a process B, a resist 63 is coated, and is subjected to exposure and development, after which the PSG 61 is etched with the PSG 61 as a mask. Since the side etching is generated, the aperture portion of the PSG 61 is slightly enlarged. In a process C, the resist 63 is removed. In a process D, a planarization film 64 made from a photosensitive resin is coated, to embed an aperture provided on the PSG 61. Finally, in a process E, the planarization film 64 is subjected to exposure for development, to expose the bottom portion of the Poly 62 within the aperture of the PSG 61. The planarization film 64 is then baked.

A method for forming the second example of the contact hole shown in FIG. 3B using a non-photosensitive resin will be described with reference to FIGS. 7A to 7F. First, in a process A, a PSG 71 is formed on a Poly 72. In a process B, a planarization film 73 made from a non-photosensitive resin is coated and baked. In a process C, a resist 74 is coated, and is subjected to exposure and development. In a process D, the planarization film 73 is etched through a resist 74. Since the side etching is generated, the aperture diameter of the planarization film 73 is enlarged. In a process E, a resist 75 is coated again, to embed the aperture of the planarization film 73. Further, by the exposure for development, the surface of the PSG 71 is exposed. In a process F, the exposed portion of the PSG 71 is etched to be removed. Then, after removal of the resist 75, the baking of the planarization film 73 is performed.

A method for forming the second example of the contact hole shown in FIG. 3B using a photosensitive resin will be described with reference to FIGS. 8A to 8E. In a process A, a PSG 82 is formed on a Poly 81. In a process B, a planarization film 83 made from a photosensitive resin is coated on the PSG 82. In a process C, the planarization film 83 is subjected to exposure, development and baking, to form a relatively large aperture. In a process D, a resist 84 is coated to embed the aperture of the planarization film 83. Further, the resist 84 is subjected to exposure and development, to form a relatively small aperture, thus exposing the surface of the PSG 82. Finally, on a process E, the exposed PSG 82 is etched to be removed. The, after the removal of the resist 84, the baking of the planarization film 83 is performed.

A method for forming the third example of the contact hole shown in FIG. 3C will be described with reference to FIGS. 9A to 9E. In this method, a non-photosensitive resin is used for a planarization film. In a process A, a PSG 92 is formed on a Poly 91. In a process B, a non-photosensitive resin is coated and baked, to form a planarization film 93. In a process C, a resist 94 is coated, and is subjected to exposure and development, to form a specified aperture. After light ashing, in a process E, the PSG 92 is subsequently etched. Finally, after the removal of the resist 94, the baking of the planarization film 93 is performed.

A method for forming the third example of the contact hole shown in FIG. 3C will be described with reference to FIGS. 10A to 10D. Differently from the method shown in FIGS. 9A to 9E, in this method a photosensitive resin is used as a planarization film. First, in a process A, a PSG 102 is formed on a Poly 101. In a process B, a photosensitive resin is coated, to form a planarization film 103. In a process C, the planarization film 103 is subjected to exposure, development and baking. After light ashing, in a process D, the PSG 102 is etched by self-alignment with the planarization film 103 as a mask. Then, the baking of the planarization film 103 is performed.

Hereinafter, a means for improving an aperture ratio according to the present invention will be described. First, for proper understanding, a prior art black mask structure will be briefly described with reference to FIG. 11. As shown in the figure, pixel electrodes 1122 are formed in a matrix with specified arrangement pitches 1130 on the inner surface of a TFT substrate 1121. Metal bus line patterns 1123 are each formed between the adjacent pixel electrodes 1122. A specified interval is formed between the pixel electrode 1122 and the metal bus line pattern 1123. Accordingly, the dimension of the pixel electrode 1122 is smaller than the arrangement pitch 1130. A facing substrate 1125 is disposed such that a liquid crystal 1124 is put between the TFT substrate 1121 and the same. A facing electrode 1126 is formed on the inner surface of the facing substrate 1125. Further, a black mask 1127 is formed by patterning so as to be matched with each gap between the adjacent pixel electrodes 1122. For ensuring the alignment margin between the facing substrate 1125 and the TFT substrate 1121, the black mask 1127 is overlapped on the end portion of each pixel electrode 1122 in a plan view. Accordingly, the dimension of the aperture portion 1128 surrounded by the black mask 1127 is smaller than the dimension 1129 of the pixel electrode 1122. In the above construction, the black mask 1127 is intended to prevent the leakage of light and hence to improve the contrast. However, as is apparent from the figure, the dimension 1129 of the pixel electrode 1122 is smaller than the arrangement pitch 130, and thereby the dimension of the aperture portion specifying the effective pixel area is made further smaller. As a consequence, the aperture ratio is set to be relatively small.

Figure 12:
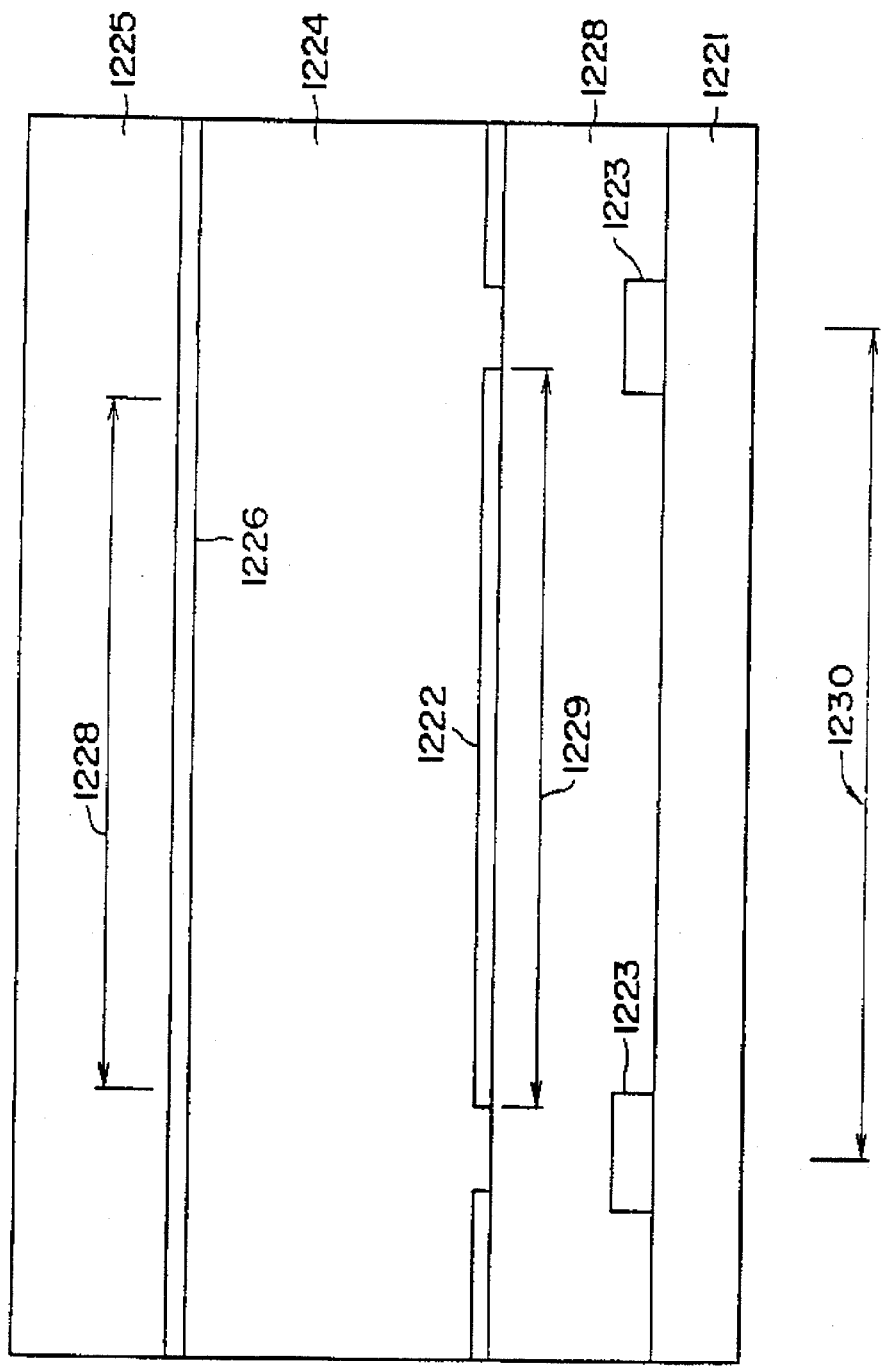
FIG. 12 is a typical sectional view showing a black mask structure of the present invention.

FIG. 12 shows a black mask structure according to the present invention. As shown in this figure, a transparent planarization film 1228 is formed for embedding the irregularities on the surface of a TFT substrate 1221, and pixel electrodes 1222 are formed on the planarization film 1228 in a matrix with specified arrangement pitches 1230. In this example, each metal bus line pattern 1223 is formed by patterning on the TFT substrate 1221 so as to be matched with the boundary portion between the adjacent pixel electrodes 1222. Accordingly, the metal bus line pattern 1223 functions as a black mask. Taking into account the difference in visual field upon observation from the tilt direction, the metal bus line pattern 1223 is slightly overlapped on the end portion of each pixel electrodes 1222 in a plan view. The dimension of the pixel electrode 1222 is thus slightly shorter than the arrangement pitch 1230. On the other hand, the facing substrate 1225 disposed to face the TFT substrate 1221 through a liquid crystal 1224 is not formed with any black mask. As is apparent from the figure, the dimension of the aperture portion 1228 as seen from the facing substrate 1225 side is obtained by subtracting the portion of the metal bus line pattern 1223 overlapped on the pixel electrode 1222 from a pixel dimension 1229, which is only slightly smaller than the arrangement pitch 1230. Consequently, as compared with the prior art, it is possible to significantly improve the aperture ratio. In this example, the metal bus line pattern 1223 serves as the black mask; however, the present invention is not limited thereto. For example, the transparent planarization film 1128 may be selectively colored in black along the boundary portion between the adjacent pixel electrodes 1222.

Figure 11:
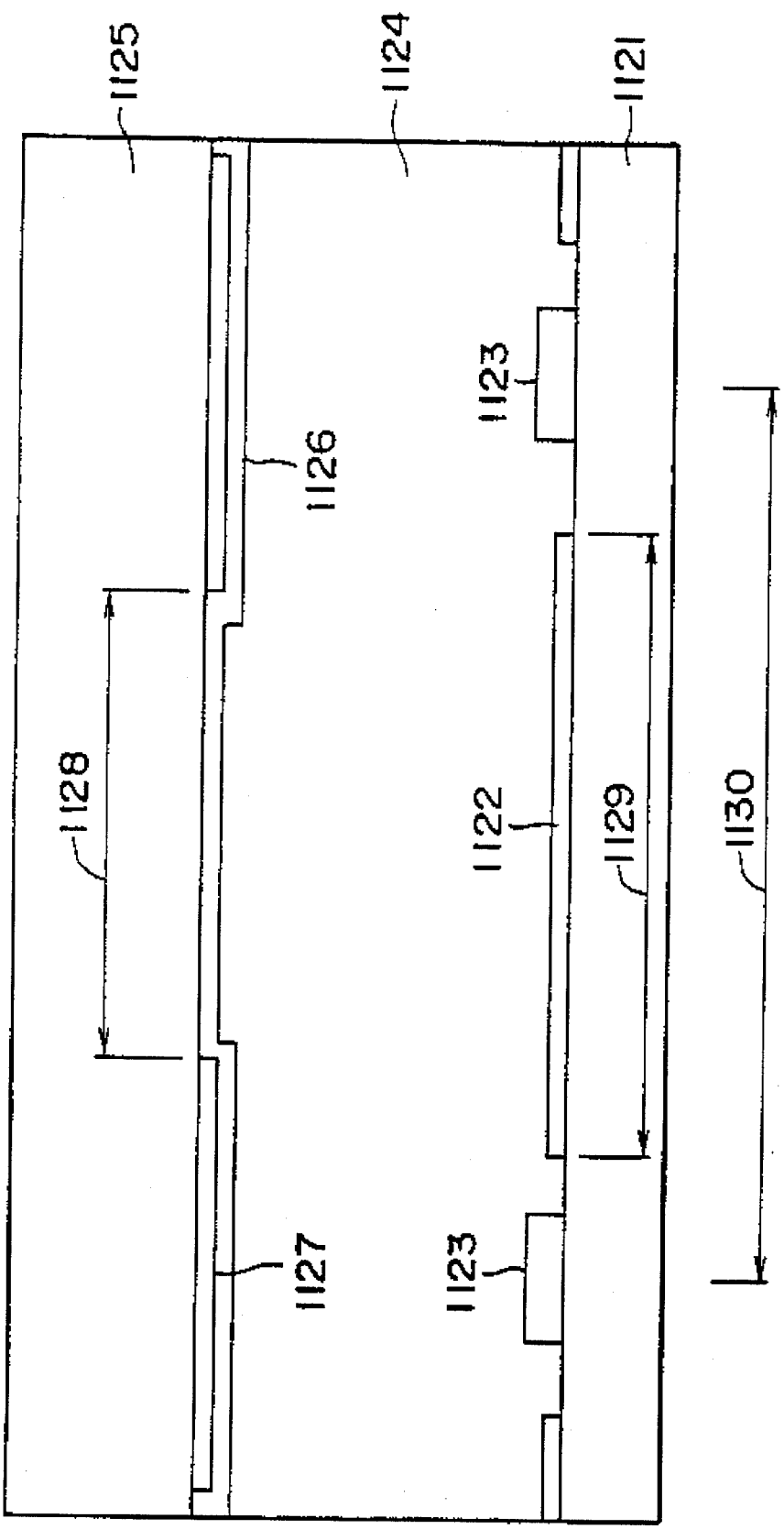
FIG. 11 is a typical sectional view showing a prior art black mask structure.
Figure 13:
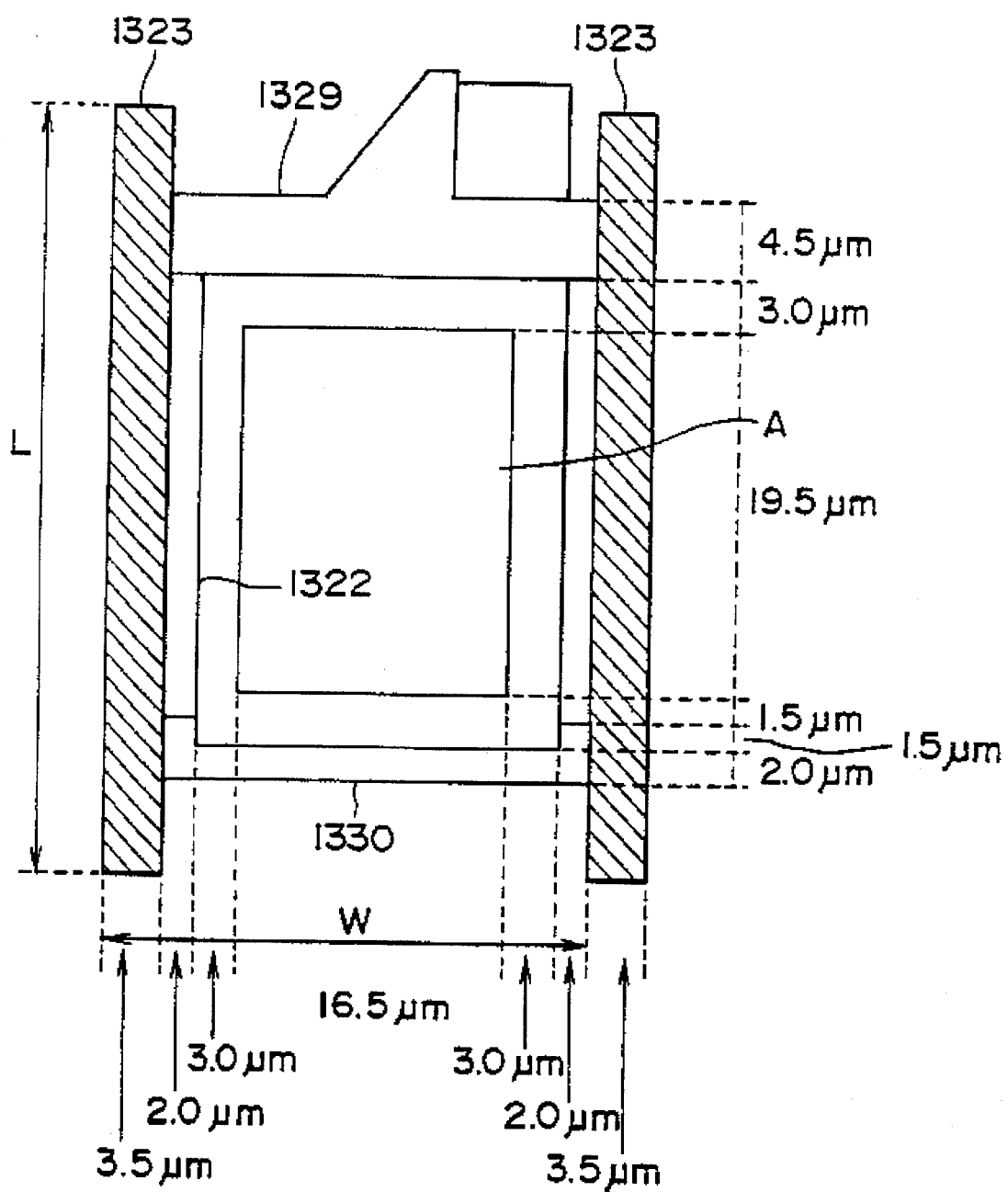
FIG. 13 is a plan view showing a prior art black mask pattern.

FIG. 13 shows the plane pattern of the prior art shown in FIG. 11, wherein the aperture ratio is calculated using concrete values. Each pixel electrode 1322 is held between a pair of metal bus line patterns 1323, and is surrounded from both the upper and lower sides by an auxiliary capacity line 1329 formed of a second poly-silicon and a gate line 1330. In this example, the widthwise arrangement pitch W of the pixel electrode 1322 is set to be 30 µm, and the longitudinal arrangement pitch L thereof is set to be 41 µm. The width dimension of the pixel electrode 1322 is set to be 22.5 µm, and the longitudinal dimension thereof is set to be 25.5 µm. The width dimension of an aperture portion A specifying the effective pixel region is set to be 16.5 μm, and the longitudinal dimension thereof is set to be 19.5 μm. Accordingly, the aperture ratio per one pixel in this prior art is calculated as follows:

(16.5μm×19.5μm)+100/(30μm×41μm)=26.2%.

In this prior art, since the black mask is formed on the facing substrate, the alignment margin to the pixel electrode 1322 must be ensured somewhat, so that the area of the aperture portion is significantly restricted. Namely, for the lateral direction, the width portion of 5 μm from the inner end of the metal bus line pattern 1323 is covered with the black mask; the width portion of 3.0 μm from the inner end of the auxiliary capacity line 1329 is shielded; and the width portion of 1.5 μm from the inner end of the gate line 1330 is shielded.

Figure 14:
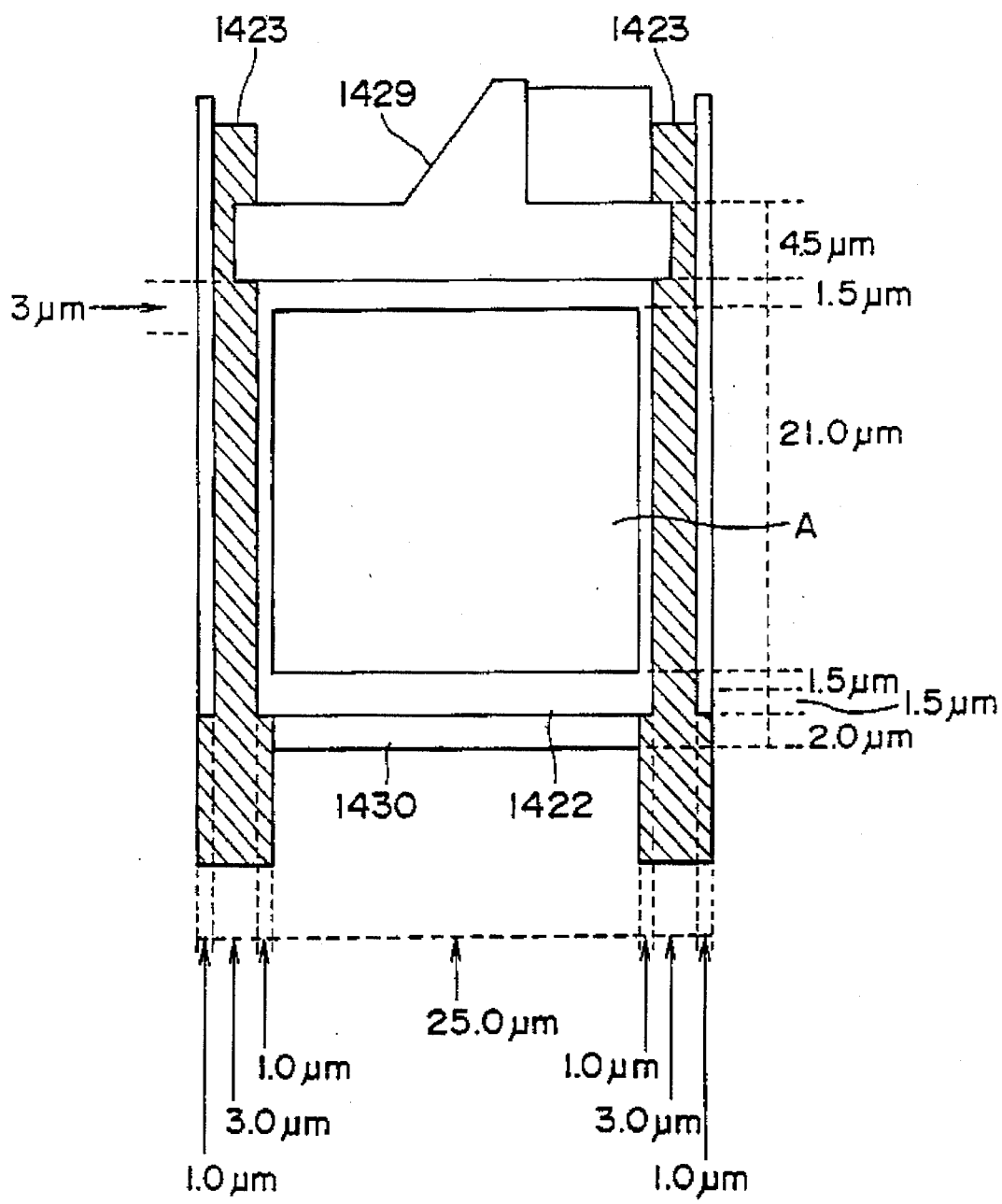
FIG. 14 is a plan view showing a black mask pattern of the present invention.

FIG. 14 shows the plane pattern of the black mask structure according to the present invention shown in FIG. 12, wherein the aperture ratio is calculated by use of concrete values. For easily comparing this example with the prior art example shown in FIG. 13, the widthwise arrangement pitch W and the longitudinal arrangement pitch L of each pixel are similarly set to be 30 μm and 41 μm, respectively. In this example, the width dimension of the aperture portion of the pixel is enlarged up to 25.0 μm as compared with the value of the prior art, 16.5 μm. Namely, the metal bus line pattern 1423 serves as a black mask, which makes it possible to significantly enlarge the width dimension of the aperture portion. Only the portion where the end portion of the pixel electrode 1422 is overlapped on each metal bus line pattern 1434 is removed from the aperture portion. Further, the longitudinal dimension L of the aperture portion is slightly enlarged up to 21.0 μm as compared with the value of the prior art, 19.5 μm. The width of 1.5 μm from the inner end of the auxiliary capacity line 1429 must be shielded in the prior art; however, in the present invention, it is enough to shield only the width of 1.5 μm. Namely, in the present invention, the auxiliary capacity lie 1429 is embedded in the planarization film, and is thus projected from the level of the pixel electrode. Accordingly, the end portion of the aperture portion can be enlarged outward by about 1.5 μm as compared with the prior art because of no effect of the lateral electric field. As a result, the aperture ratio per one pixel is calculated as follows:

(16.5μm+2×(3.0μm+1.25μm))×(19.5μm+1.5 μm)×100/(30μm× 41μm)=42.6%

This shows that the aperture ratio can be significantly improved as compared with that of the prior art (26.2%).

Figure 15:
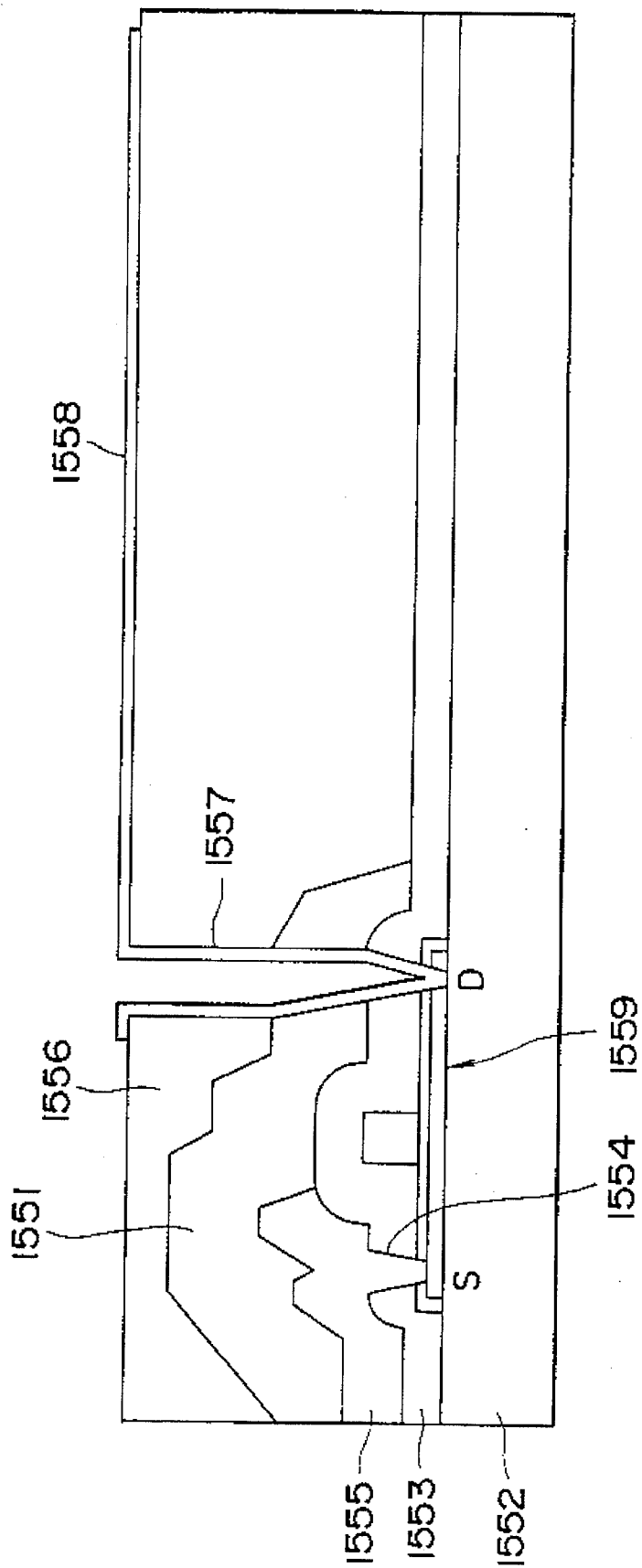
FIG. 15 is a typical view showing a shading structure of an active-matrix substrate of the present invention.

FIG. 15 is a typical sectional view showing one example of a shading structure of an active-matrix substrate according to the present invention. As described above, the boundary portion between adjacent pixel electrodes can be at least partially shielded using a metal bus line pattern as a black mask. However, the portion of a TFT 1559 cannot adopt this shielding structure. In the structure shown in FIG. 15, for selectively shielding the TFT portion, a shading layer 1551 made from metal is used. As shown in the figure, the TFTs are integrally formed on the surface of a substrate 1552. A layer insulating film 1553 is formed for covering the TFT. A metal bus line pattern 1555 is electrically connected to a source region S of the TFT by way of a first contact hole 1554 through the layer insulating film 1553. The TFT 1559 is shielded by the shading layer 1551 formed by patterning in a specified shape. Further, a planarization film 1556 is formed on the TFT for embedding the irregularities on the surface of the TFT. A pixel electrode 1558 is electrically connected to a drain region D of the TFT by way of a second contact hole 1557 passing through the planarization film 1556, the shading layer 1551 and the layer insulating film 1553. In this example, by use of the shading layer 1551, the TFT can be substantially perfectly shielded. However, the shading layer 1551 is removed from the second contact hole 1557, the leakage of light is slightly generated in the second contact hole 1557.

Figure 16:
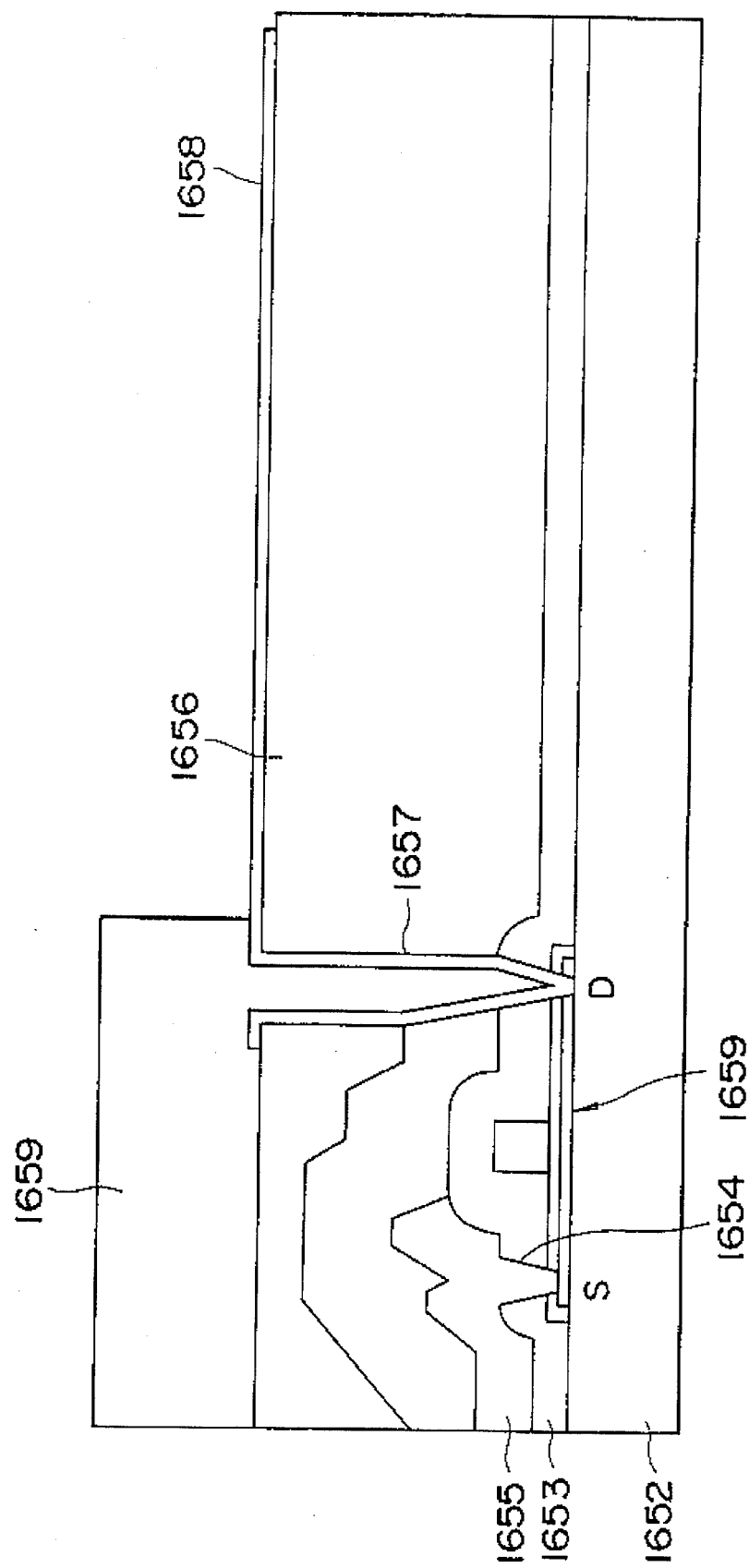
FIG. 16 is a typical view showing another shading structure of an active-matrix substrate of the present invention.

FIG. 16 is a typical sectional view showing the improvement example of the shading structure shown in FIG. 15. This example is the same as the example shown in FIG. 15, except that a shading layer 1659 is formed on the upper side of a planarization film 1656. With this structure, the whole TFT 1659 including a second contact hole 1657 can be perfectly shielded. However, since the shading layer 1659 is partially overlapped on a pixel electrode 1658, a stepped portion is generated as compared with the structure shown in FIG. 15, which slightly sacrifices the planarization.

Figure 17:
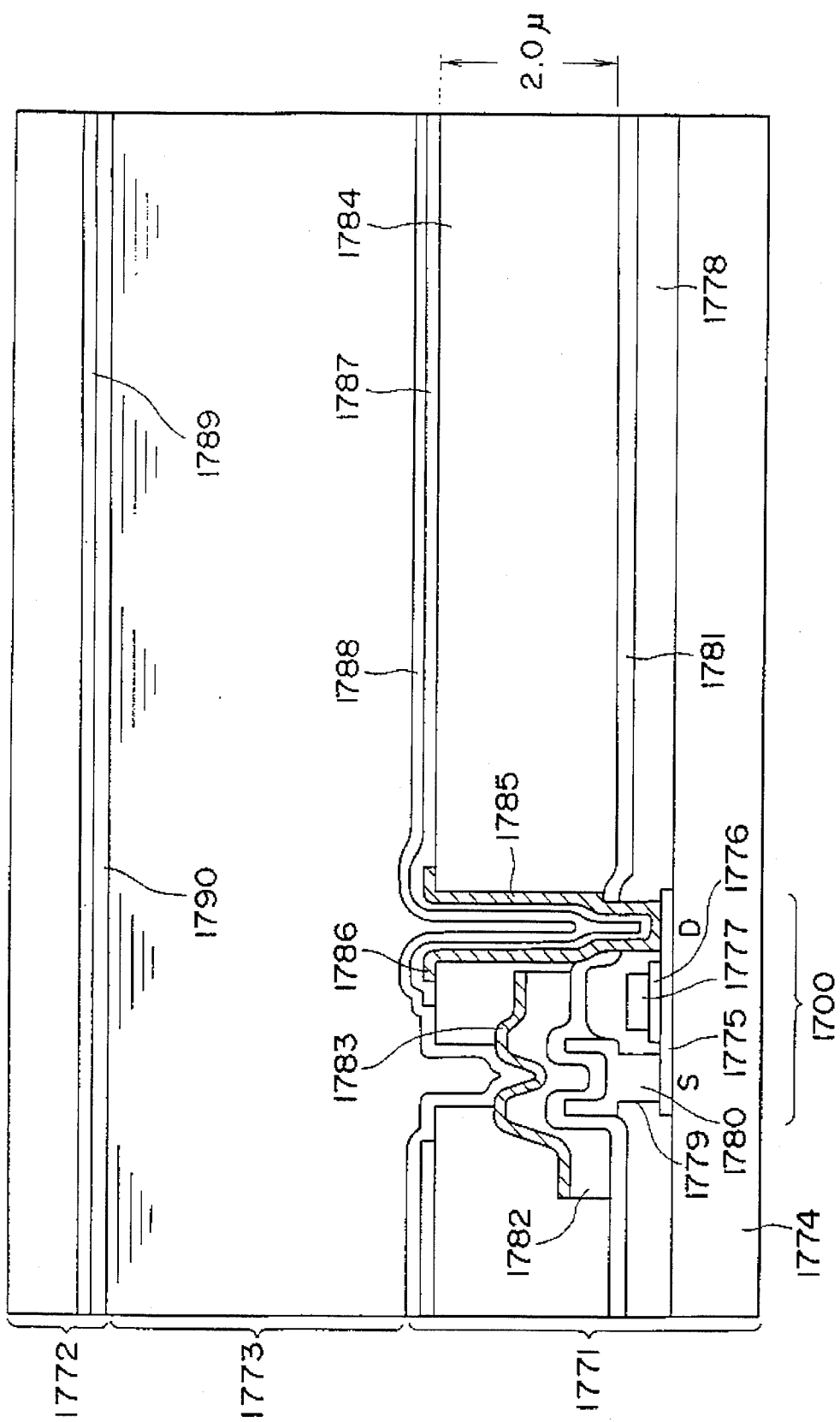
FIG. 17 is a sectional view showing one example of an active-matrix color liquid crystal display device of the present invention.

FIG. 17 is a typical sectional view showing an embodiment wherein a planarization film of the present invention is used as a color filter in an active-matrix liquid crystal display device. As shown in the figure, this color liquid crystal display device includes an active-matrix substrate 1771 and a facing substrate 1772 which are disposed to face to each other with a specified interval, and a liquid crystal 1773 inserted in the interval between both the substrates. TFTs 1700 are integrally formed on the surface of an insulating substrate 1774. The TFTs 1700 include first polysilicons 1775 formed by patterning in a dotted pattern, and gate electrodes 1777 formed by patterning through a gate insulating film 1776. The gate electrode 1777 is made from, for example a second polysilicon. The TFT 1700 is covered with a first layer insulating film 1778. A metal bus line pattern 1780 is electrically connected to a source region S of the TFT by way of a first contact hole 1779 provided on the first layer insulating film 1778. The metal bus line pattern 1780 is covered with a second layer insulating film 1781, on which a passivation film 1782 is formed by patterning. The passivation film 1782 is made from, for example p-SiN formed by a plasma CVD method. A shading film 1783 is formed on the passivation film 1782, to shield the TFT. A planarization film 1784 is deposited to embed the irregularities on the TFT and the metal bus line film 1780. The planarization film 1784 has a film thickness of at least 2.0 μm enough to embed the irregularities of about 1 μm to 2 μm. A second contact hole 1785 is provided so as to pass through the planarization film 1784, the second layer insulating film 1781 and the first layer insulating film 1778. The interior and the periphery of the second contact hole 1785 are covered with the shading layer 1786. A pixel electrode 1787 is electrically connected to a drain region D of the TFT through the second contact hole 1785. This embodiment has a feature in that the portion of the planarization film 1784 matched with the pixel electrode 1787 is colored in a specified hue, to form a color filter. The selective coloring of the planarization layer 1784 can be made by use of, for example a pigment diffusion method. Differently from the prior art, the color filter is provided integrally on the active-matrix substrate 1771 side, which eliminates the alignment margin between the pixel electrode and the color filter. In addition, the surface of the pixel electrode 1787 is covered with an alignment film 1788.

On the other hand, a facing electrode 1789 and an alignment film 1790 are formed on the inner surface of the facing electrode 1772 so as to overlapped to each other. The liquid crystal 1773 held by a pair of the upper and lower alignment films 1790 and 1788 is uniformly controlled in a desired alignment state.

Figure 18:
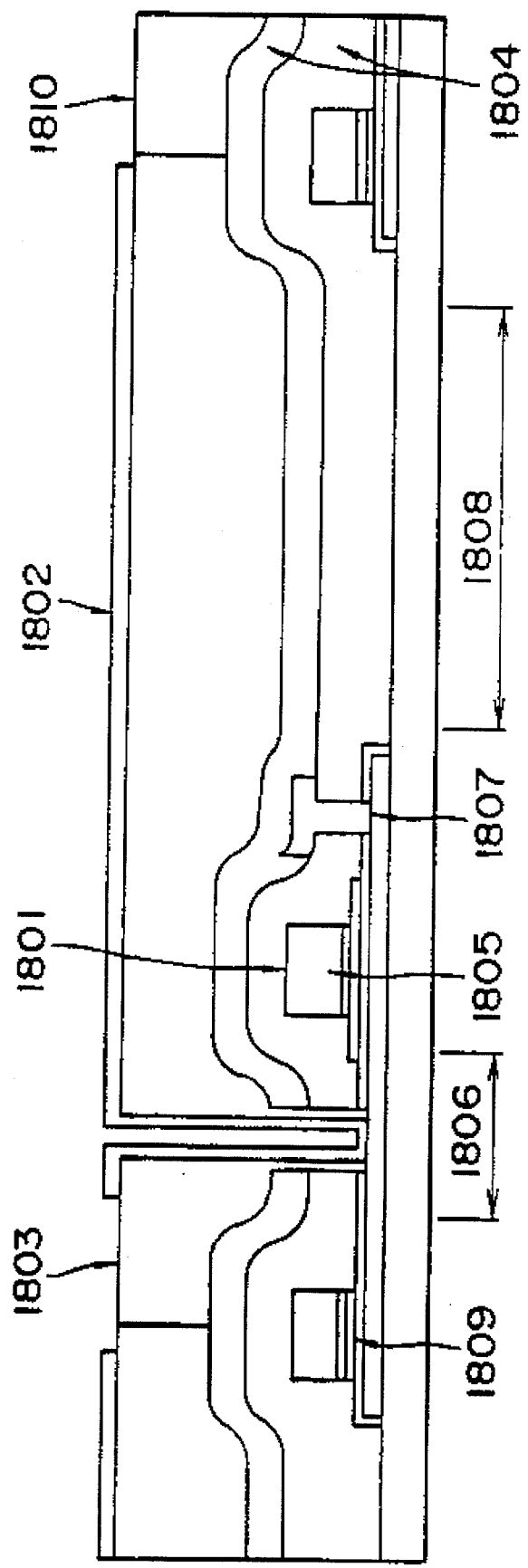
FIG. 18 is a sectional view showing one example of a TFT substrate of the present invention.

FIG. 18 is a sectional view of an embodiment wherein a color filter is integrally formed on a TFT substrate similarly to the embodiment shown in FIG. 17; and FIG. 19 is a plan view thereof.

In FIG. 18, reference numerals 1801, 1802, 1803, 1804, 1805, 1806, 1807, 1808 and 1809 indicate a pixel transistor, a pixel electrode, a color filter, a layer insulating film, a gate bus line, a contact portion, a signal line, an aperture portion (light transmitting portion) and a Cs bus line, respectively. Further, reference numerals 1810 and 18011 indicate color filters having respective colors different from that of the color filter 1803. In this embodiment, to connect the pixel electrode to the pixel transistor, a contact hole is formed on the color filter.

Figure 20:
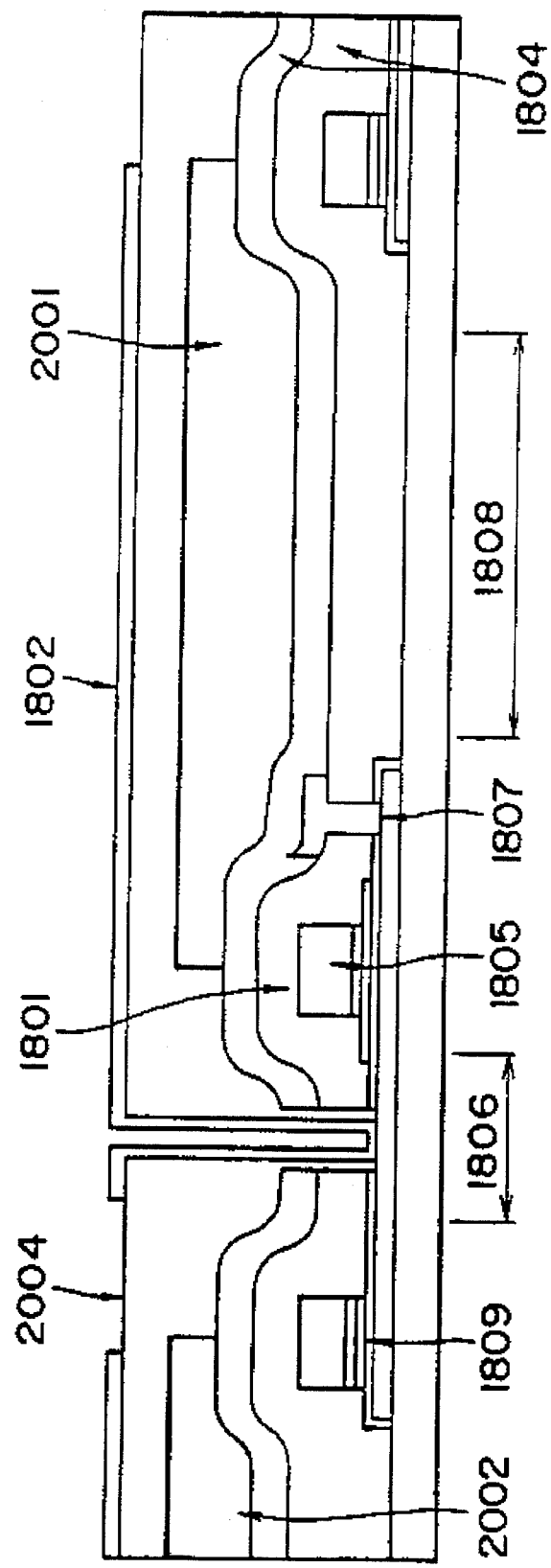
FIG. 20 is a sectional view of a TFT substrate according to another embodiment of the present invention.
Figure 21:
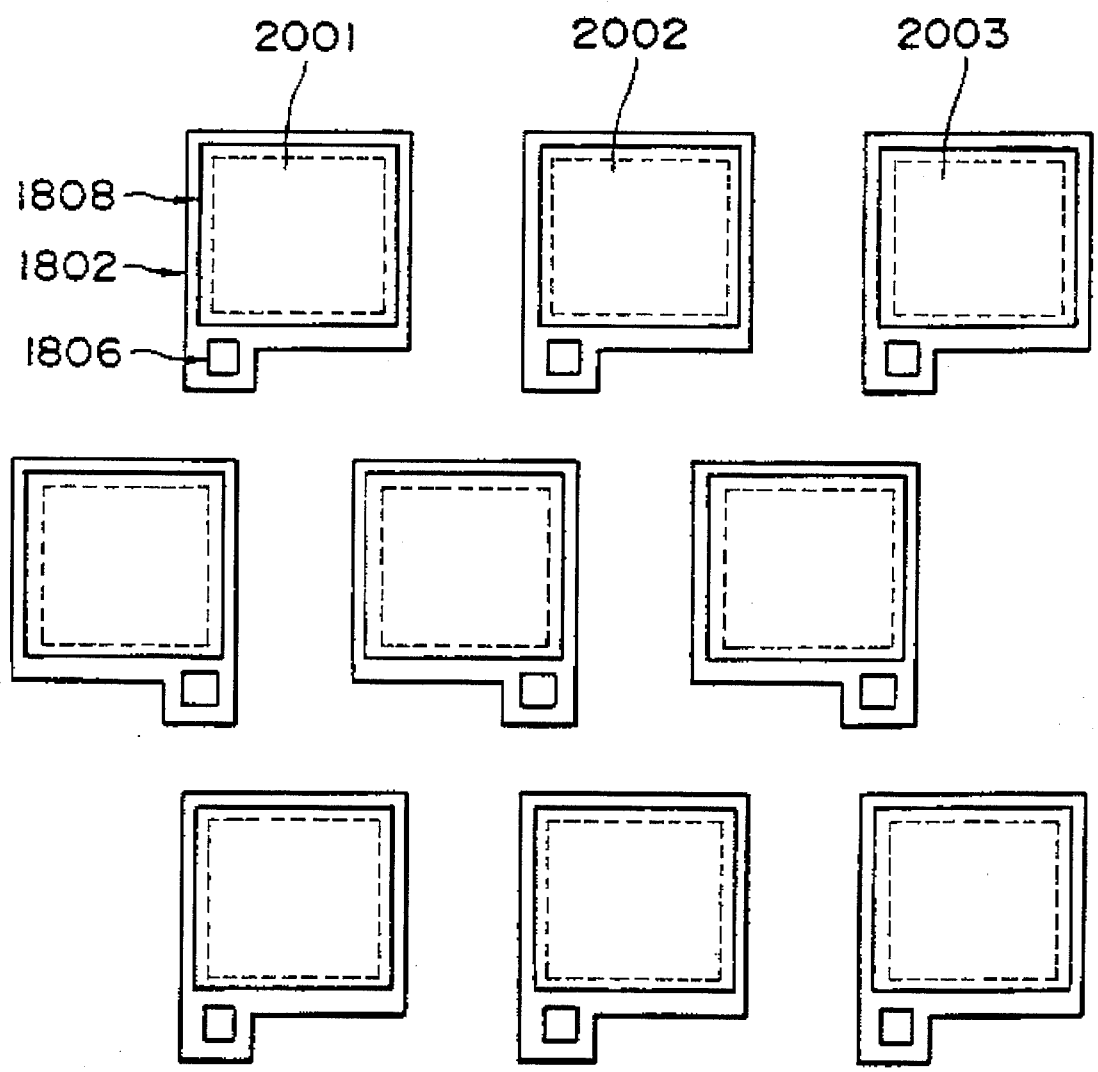
FIG. 21 is a plan view of FIG. 20.

FIGS. 20 and 21 show an embodiment different from the above embodiment. In this embodiment, similarly to the embodiment shown in FIG. 18, a color filter is integrally formed on the TFT substrate; but it is formed only on the aperture portion. In FIG. 20, parts corresponding to those shown in FIG. 18 are indicated at the corresponding reference numerals. As shown in the figure, the color layer is formed on the aperture portion, after which a planarizating agent is applied to form a planarization film 2004. With this construction, a contact hole portion requiring the fine processing is formed by processing the planarization layer. The planarizing agent does not contain particles with a large particle size such as pigment, and is thus easily subjected to the fine processing. Since the planarizing agent does not contain the pigment for the color filter, the pixel transistor portion is prevented from being contaminated by metal ions generated by the pigment. As described above, according to this embodiment, it is possible to easily form the color filter on the TFT substrate.

According to the above-described embodiments, the planarization film is applied on the active-matrix substrate to absorb the corrugation of the surface to remove the stepped portions. Accordingly, the pretilt angle of liquid crystal molecule can be equalized, to suppress the reverse tilt domain, thus making it possible to improve the display quality. In this regard, it is possible to reduce the width of the black mask for shielding the alignment defect portion, which leads to the improvement in the aperture ratio. By interposing the planarization film, it is possible to equalize the direction of the electric field applied to the liquid crystal with respect to the pretilt angle, and hence to suppress the reverse tilt domain. By reducing the corrugation of the surface of the TFT substrate, it is possible to eliminate the nonuniformity in the thickness of the alignment film. For the same reason, the alignment defect in the rubbing treatment can be effectively reduced. Further, by reducing the corrugation of the seal portion, it is possible to increase the adhesion strength between a pair of the upper and lower substrates, and hence to prevent the leakage of the liquid crystal. By performing the coloring in such a state that the planarization film is matched with the pixel electrode, it is possible to integrally form the color filter on the TFT substrate, which is effective to relax the accuracy of the alignment between a pair of the upper and lower substrates. Further, it is possible to at least partially form a black mask pattern on the TFT substrate side, and hence to relax the alignment accuracy on a pair of the upper and lower substrates.

Next, there will be shown an embodiment wherein the effect of the lateral electric field generated between adjacent pixel electrodes is suppressed.

In this embodiment, a device bus line area including thin film transistor devices and bus lines is covered with a planarization layer made from a transparent resin or the like over the whole surface. The planarization layer has a thickness sufficient to embed the irregularities on the surface of the device bus line area, thus making it possible to obtain a substantially flat surface. Accordingly, theoretically, pixel electrodes can be formed on the surface of the planarization layer without any effect of the irregularities of the device bus line area, so that there is no problem even if it is overlapped on the underlayer bus line in a plan view. Accordingly, even in the case of enhancing accuracy and fineness of the liquid crystal pixels, it is possible to ensure a sufficient area for each pixel electrode without harming the aperture ratio. However, when the dimension of the interval between the adjacent pixel electrodes is reduced without any restriction, a subsidiary lateral electric field is relatively enlarged as compared with the normal vertical electric field. As a consequence, by setting the dimension of the interval between the adjacent pixel electrodes to be larger than the thickness dimension of the liquid crystal layer, the effect of the lateral electric field is substantially removed, to thus prevent the reverse tilt domain or light fallout.

Figure 22:
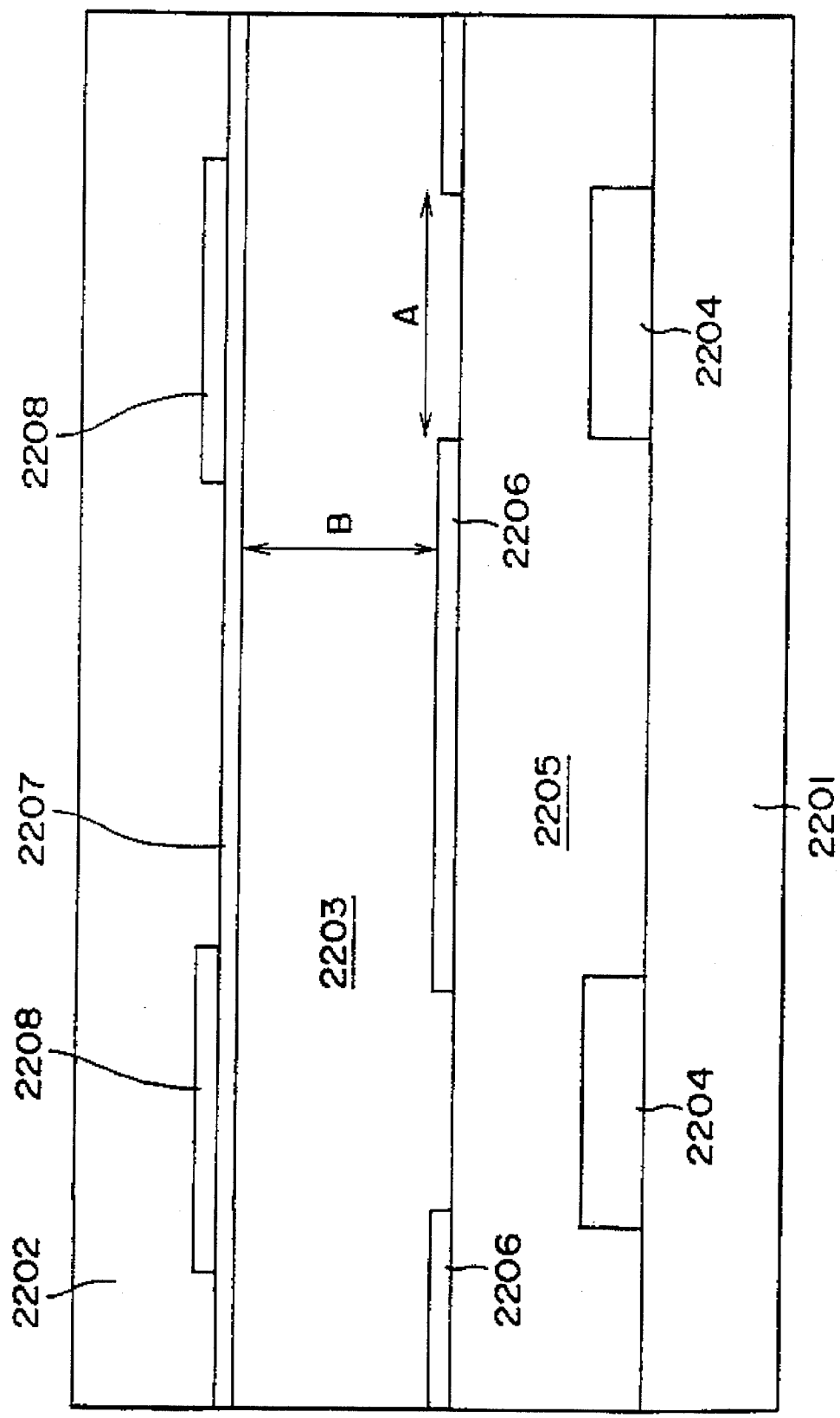
FIG. 22 is a typical sectional view showing the other preferred embodiment of an active-matrix liquid crystal display device.

A preferred embodiment will be described in detail with reference to the drawings. FIG. 22 is a typical sectional view showing an embodiment of an active-matrix liquid crystal display device according to the present invention. As shown in the figure, the active-matrix liquid crystal display device includes a main substrate 2201 and a facing substrate 2202 which are disposed so as to face to each other with a specified interval. A liquid crystal layer 2203 is held between both the substrates 2201 and 2202, and which has a specified thickness B. A device bus line area including a plurality of thin film transistor devices (not shown) and bus lines 2204 is formed on the surface of the main substrate 2201. In addition, the bus line 2204 includes a signal bus line electrically connected to a source region of the thin film transistor, a gate bus line electrically connected to a gate electrode of the thin film transistor, and the like. A planarization layer 2205 is formed to embed the irregularities on the surface of the device bus line area. The planarization layer 2205 is made from a transparent resin or the like, and has a film thickness sufficiently larger as compared with the dimension of the stepped portions of the bus line 2204. Accordingly, the surface of the planarization layer 2205 is substantially flat. Pixel electrodes 2206 are formed in a matrix on the flat surface of the planarization layer 2205. The present invention has a feature in that the interval dimension A between the adjacent pixel electrodes 2206 is set to be larger than a thickness dimension B of the liquid crystal.

In this embodiment, the bus lines 2204 are formed by patterning so as to be matched with the intervals between the adjacent pixel electrodes 2206. In this case, since the stepped portions of the bus line 2204 is perfectly absorbed by the planarization layer 2205, even if the end portion of the pixel electrode 2206 is overlapped on the bus line 2204 in a plan view, there is generated no irregularities, so that there is no trouble in performing the alignment control for the liquid crystal 2203.

On the other hand, a facing electrode 2207 is formed on the inner surface of the facing substrate 2202. As is apparent from the figure, a thickness B of the liquid crystal layer 2203 is equal to the interval dimension between the facing electrode 2207 and the pixel electrode 2206. When a specified voltage is applied between the facing electrode 2207 and the pixel electrode 2206, the molecular alignment of the liquid crystal layer 2203 is changed, to vary the transmissivity, thus performing the desired image display. In this case, since the interval dimension A between the adjacent pixel electrodes 2206 is set to be larger than the interval dimension B between each pixel electrode 2206 and the facing electrode 2207, it is possible to suppress the subsidiary lateral electric field so as to be relatively smaller than the normal vertical electric field. This makes it possible to suppress the reverse tilt domain of the liquid crystal layer 2203 and the light fallout. In addition, a black mask 2208 is formed on the inner surface of the facing substrate 2202 so as to be matched with the intervals between the pixel electrodes 2206 arranged in a matrix. The black mask 2208 is provided to enhance the effective display contrast by masking the portion of the liquid crystal layer 2203 which does not contribute to the image display. Further, while not shown in the figure, the inner surfaces of the main substrate 2201 and the facing substrate 2202 are applied with specified alignment treatments respectively, so that the liquid crystal layer 2203 is in the state of, for example, the twisted nematic alignment.

Figure 23:
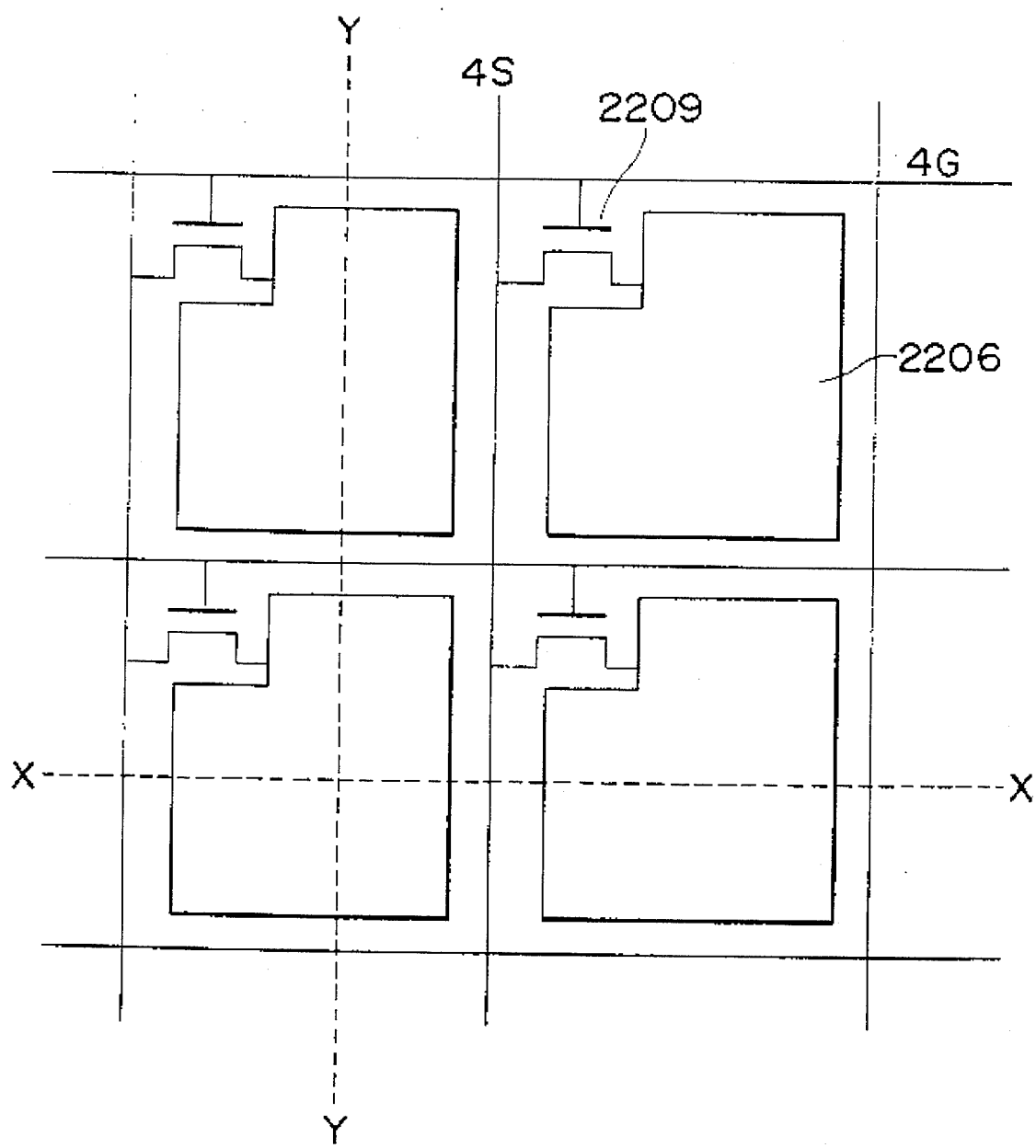
FIG. 23 is a typical plan view of a device shown in FIGS. 2A to 2G.

FIG. 23 is a typical plan view of the active-matrix liquid crystal display device shown in FIG. 22. Pixel electrodes 2206 are arranged in a matrix. A gate bus line 4G is disposed in the X-direction along each line interval between the pixel electrodes 2206. Further, a signal bus line 4S is disposed in the Y-direction along the row interval between the pixel electrodes 2206. A thin film transistor (TFT) 2209 for switching is formed to correspond to each pixel electrode 2206. In the TFT 2209, a gate electrode is connected to the corresponding gate bus line 4G; a source electrode is connected to the corresponding signal bus line 4S; and a drain electrode is connected to the corresponding pixel electrode 2206. A selective pulse is supplied to the gate bus line 4G in the line sequential manner, so that the pixel electrodes 2206 are made conductive for each line. In synchronization with the above, an image signal is supplied to the signal bus line 4S, and is written in each pixel electrode 2206 through the conductive TFT 2209, thus performing the desired image display. In addition, in the case of the liquid crystal display device, the A.C drive is performed, and the polarity of the image signal is reversed for one line. The polarity of the image signal may be reversed for one field.

Figure 24A:
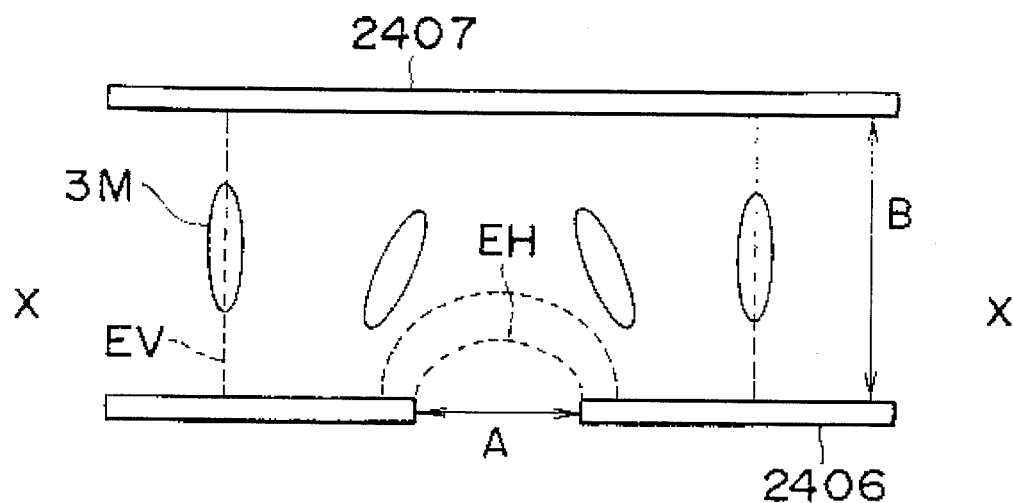
FIG. 24A and 24B are views for explaining the action of the liquid crystal display device shown in FIGS. 22 and 23.
Figure 24B:
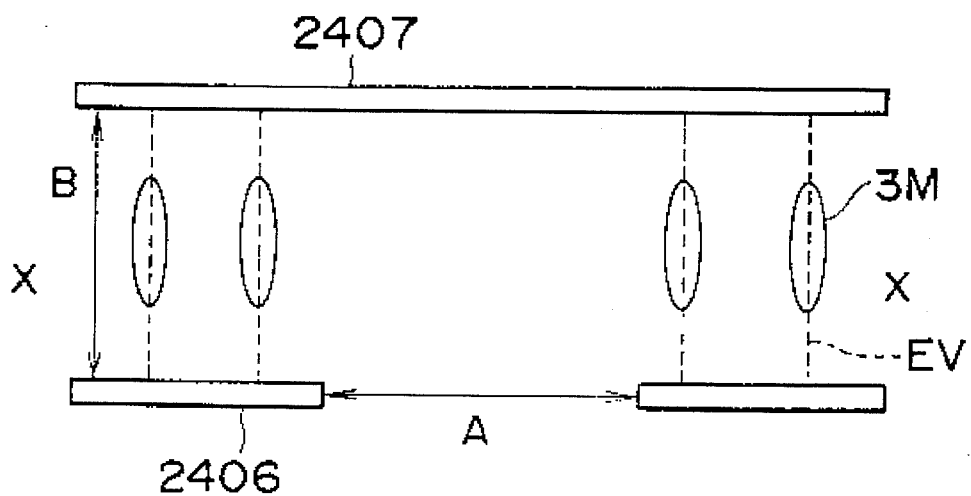

Next, the action of the active-matrix liquid crystal display device shown in FIGS. 22 and 23 will be described with reference to FIGS. 24A, 24B and FIGS. 25A and 25B. FIGS. 24A and 24B are typical sectional views taken along the line X-X of FIG. 23. FIG. 24A shows the case that an interval A between adjacent pixel electrodes 2406 is set to be smaller than an interval B between a facing electrode 2407 and each pixel electrode 2406. FIG. 24B shows the case that the interval A is set to be larger than the interval B according to the present invention. In the electrode arrangement structure of FIG. 24A, when a voltage is applied across each pixel electrode 2406 and the facing electrode 2407, a lateral electric field EH generated between the adjacent pixel electrodes is made stronger than a normal vertical electric field EV, so that liquid crystal molecules 3M positioned in the vicinity of the end portion of each pixel electrode 2406 are not directed in the desired vertical direction, but is directed in the tilt direction. This causes the reverse tilt domain and light fallout, thus leading to the deterioration of the image quality. On the other hand, in the electrode arrangement in FIG. 24B, even when a voltage is applied across each pixel electrode 2406 and the facing electrode 2407, the lateral electric field is sufficiently smaller than the vertical electric field, so that the liquid crystal molecules 3M are not affected by the adjacent pixel electrodes, and can be directed in the desired direction.

Figure 25A:
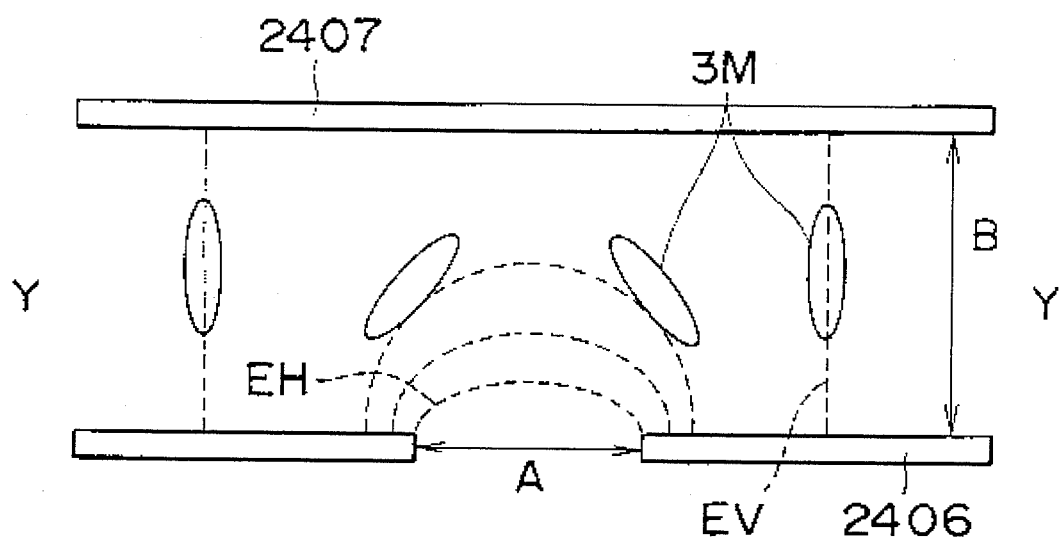
FIG. 25A and 25B are views for explaining the action of the liquid crystal display device shown in FIGS. 22 and 23.
Figure 25B:
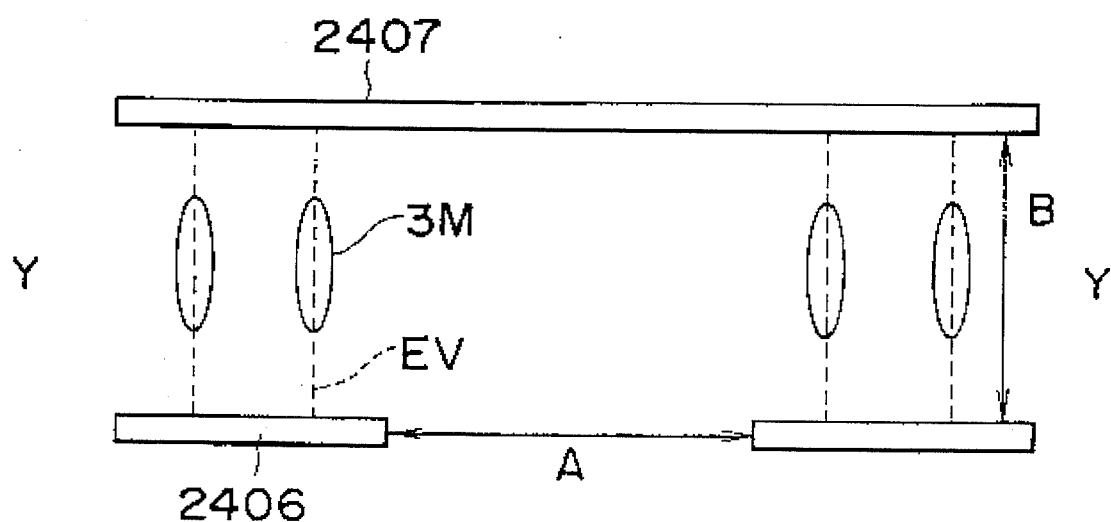

FIGS. 25A and 25B are sectional views taken along the line Y-Y shown in FIG. 23. FIG. 25A shows the case that an interval A between the adjacent pixel electrodes 2406 is set to be smaller than an interval B between a facing electrode 2407 and a pixel electrode 2406 for ensuring the aperture ratio. FIG. 25B shows the case that the interval A is set to be larger than the interval B according to the present invention. In the electrode arrangement structure in FIG. 25A, particularly when the drive is performed by reversal of the polarity for each line, positive and negative voltages are applied across the adjacent pixel electrodes 2406, liquid crystal molecules 3M are affected by a larger lateral electric field EH, to be thus disturbed. Namely, by performing the polarity reverse drive for each line, the potential difference between the upper and lower pixel electrodes shown in FIG. 25A is significantly enlarged as compared with the potential difference between the right and left pixel electrodes shown in FIG. 24A. Accordingly, the relationship of A>B specified by the present invention is required to be particularly satisfied between the upper and lower pixel electrodes. As shown in FIG. 25B, when each pixel electrode 2406 and the facing electrode 2407 are disposed to satisfy the relationship of A>B, the adverse effect by the lateral electric field can be removed, which makes it possible to raise the liquid crystal molecules 3M in the desired vertical direction.

The relationship of A>B specified by the present invention is important, particularly, for the active-matrix liquid crystal display device adopting a planarization layer. Namely, in the active-matrix liquid crystal display device having a planarization layer capable of ensuring a high aperture ratio, the area of each pixel electrode can be enlarged more than that of the prior art. Further, since the distance between the adjacent pixel electrodes can be theoretically reduced up to the limited value of the patterning accuracy, there often occurs the state that the relationship of A>B is not satisfied. As a manufacturing method for usually satisfying in stable fashion the relationship of A>B, gap spacers having a particle size smaller than the distance between the pixel electrodes may be scattered on the substrates, before sticking of the main substrate on the facing substrate. According to this method, even when the distance between the adjacent electrodes is largely reduced, it is possible to physically stably ensure the relationship of A>B. However, along with the advance of enhancing the accuracy and fineness, and the high aperture ratio of the liquid crystal pixels, the thickness of the liquid crystal layer is lowered, so that it is required to suitably select the liquid crystal material satisfying the specified electric-optical characteristics.

Figure 26:
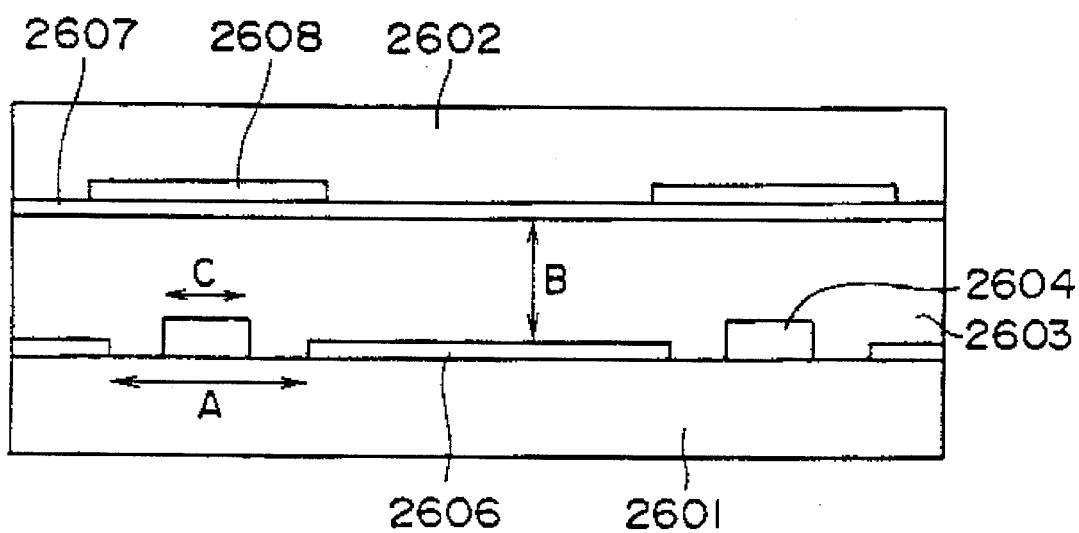
FIG. 26 is a typical sectional view showing another embodiment of an active-matrix liquid crystal display device of the present invention.

Although the above-described embodiment shows the active-matrix liquid crystal display device where the planarization layer is formed, the present invention is not limited thereto. Even in an active-matrix liquid crystal display device having no planarization layer, when the signal bus line and the gate bus line are made fine along with the demands toward the enhancement of accuracy and fineness, the present invention may be similarly effective. In this regard, the other embodiment will be described in detail with reference to FIG. 26. As shown in the figure, an active-matrix liquid crystal display device has a main substrate 2601 and a facing substrate 2602 which are disposed to face to each other with a specified interval. A liquid crystal layer 2603 having a specified thickness B is held between both the substrates 2601 and 2602. Pixel electrodes 2606 are arranged in a matrix on the surface of the main substrate 2601 with specified interval A. Further, a thin film transistor device (not shown) is formed to correspond to each pixel electrode 2606. Additionally, a bus line 2604 is disposed along each interval between the pixel electrodes 2606 arranged in a matrix. The width dimension C of the bus line 2604 is reduced to be less than the thickness dimension B of the liquid crystal layer 2603, while an interval dimension A between the adjacent pixel electrodes 2604 is set to be larger than the thickness dimension B of the liquid crystal layer 2603. For example, the thickness dimension B is about 3 to 4 µm. On the other hand, the width dimension C of the bus line 2604 may be reduced to be about 1 µm by lowering the resistance using an ultra-LSI technique. In this case, it is possible to make the interval dimension A between the adjacent pixel electrodes smaller than the thickness dimension B of the liquid crystal layer 2603 in terms of the manufacturing technique. In this case, however, there is a fear of causing the reverse tilt domain and light fallout, as described above. As a result, the interval dimension A between the pixel electrodes 2606 is set to be larger than the thickness dimension B of the liquid crystal layer 2603 according to the present invention.

Figure 27:
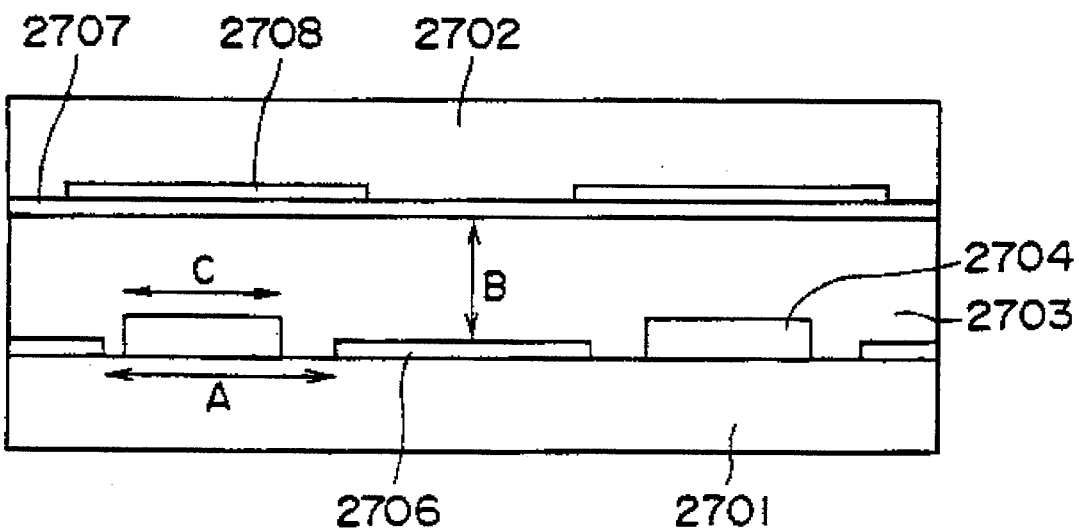
FIG. 27 is a sectional view showing a reference example of an active-matrix liquid crystal display device.

For reference, FIG. 27 shows the arrangement structure of each pixel electrode 2706 and a facing electrode 2707 in the general active-matrix liquid crystal display device. As described above, the thickness dimension B of a liquid crystal layer 2903 is set to be 3 to 4 µm. On the other hand, the width dimension C of the bus line 2709 is limited to 2.5 µm by use of the general processing technique. Accordingly, an interval dimension A between the adjacent pixel electrodes 2706 is about 5.5 µm, which is larger than the thickness dimension B of the liquid crystal layer 2903. Accordingly, in the general active-matrix liquid crystal display device, the relationship between A and B is not required to be taken into account. However, in the case that the bus line 2704 is made fine to enhance the accuracy and fineness of the active-matrix liquid crystal display device, the relationship of A>B specified by the present invention is important.

As described above, in the case that the active-matrix liquid crystal display device is intended to be enhanced in accuracy and fineness without the planarization layer, the width dimension of the bus line is reduced to be less than the thickness dimension of the liquid crystal layer, and also the interval dimension between the adjacent pixel electrodes is set to be larger than the thickness dimension of the liquid crystal layer. Namely, in the plan structure where the signal bus line and the gate bus line are disposed along each interval between the pixel electrodes arranged in a matrix, the width dimension of the bus line is reduced to be less than the thickness dimension of the liquid crystal layer for enhancing the accuracy and fineness. In this case, when the interval dimension between the adjacent pixel electrodes is reduced without any restriction, there is the fear that the subsidiary lateral electric field is enlarged more than the normal vertical electric field. Accordingly, even in this case, by setting the interval dimension between the pixel electrodes to be larger than the thickness dimension of the liquid crystal, it is possible to prevent the reverse tilt domain and the light fallout.

As described above, for enhancing the accuracy and fineness of the active-matrix liquid crystal display device, and for obtaining the high aperture ratio, assuming that the interval between the adjacent pixel electrodes is taken as A and the interval between the pixel electrode and the facing electrode is taken as B, the reverse tilt domain and the light fallout can be suppressed by satisfying the relationship of A>B. This makes it possible to obtain the active-matrix liquid crystal display device of a high image quality and the high contrast.

Next, there will be shown a liquid crystal pixel separation structure capable of enhancing the accuracy and the fineness of an active-matrix liquid crystal display device.

Figure 28:
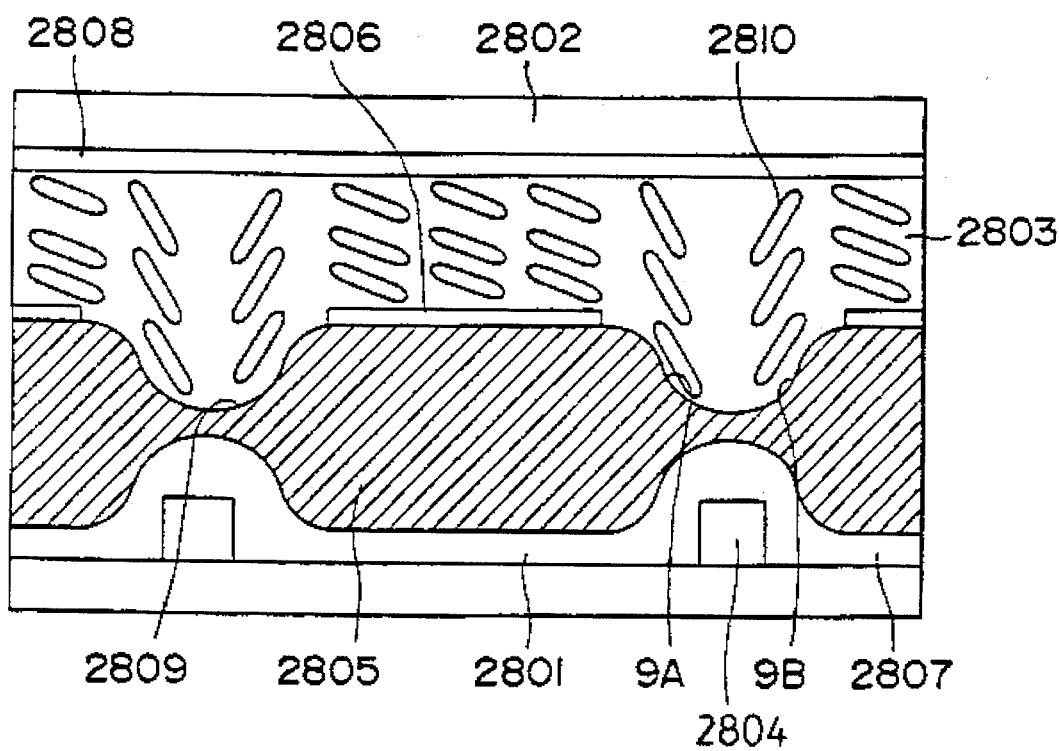
FIG. 28 is a typical partial sectional view of an active-matrix liquid crystal display device showing a further embodiment of the present invention.

An embodiment will be described in detail with reference to the drawings. FIG. 28 is a typical sectional view showing the embodiment of an active-matrix liquid crystal display device according to the present invention. As shown in the figure, the active-matrix liquid crystal display device has a cell structure composed of a pair of substrates 2801 and 2802 which are disposed to face to each other with a specified interval, and a liquid crystal layer 2803 held in the interval. One substrate 2801 includes a region where thin film transistors (not shown) and bus lines 2804 are formed; an insulating layer 2805 which is formed on the above region and has a relatively flat surface; and pixel electrodes 2806 arranged on the insulating layer 2805 in a matrix. In this embodiment, the insulating layer 2805 is formed of a planarization film made from resin material for perfectly planarizing the irregularities on the surface of the substrate 2801 such as the bus lines 2804. In addition, a layer insulating film 2807 is interposed between the bus lines 2804 and the insulating layer 2805 formed of the planarization film. On the contrary, the other substrate 2802 includes a facing electrode 2808, which constitutes a liquid crystal pixel between each pixel electrode 2806 and the same. The present invention has a feature in that each separation groove 2809 is formed on the flat surface of the insulating layer 2805 surrounding each pixel electrode 2806, to separate the adjacent liquid crystal pixels from each other.

By provision of the separation recessed grooves 2809, liquid crystal molecules 2810 of the liquid crystal layer 2803 exhibit the following behavior. In addition, for convenience, the rubbing of the surface of the substrate 2801 is made in the direction from the right to the left in the figure. As shown in the figure, by applying of the specified rubbing treatment R, the liquid crystal molecules 2810 are aligned in the normal tilt state along the one tilt surface 9A of the separation recessed groove 2809. On the other hand, the liquid crystal molecules 2810 are aligned in the reverse tilt state along the other tilt surface 9B. However, the liquid crystal molecules 2810 in the reverse tilt state are strongly restricted by the liquid crystal molecules 2810 in the normal tilt state. As a result, the reverse tilt domain generated in the tilt surface 9B of the separation recessed groove 2809 is not enlarged along the lateral direction, and therefore, the adjacent liquid pixels can be effectively separated from each other.

Figure 29:
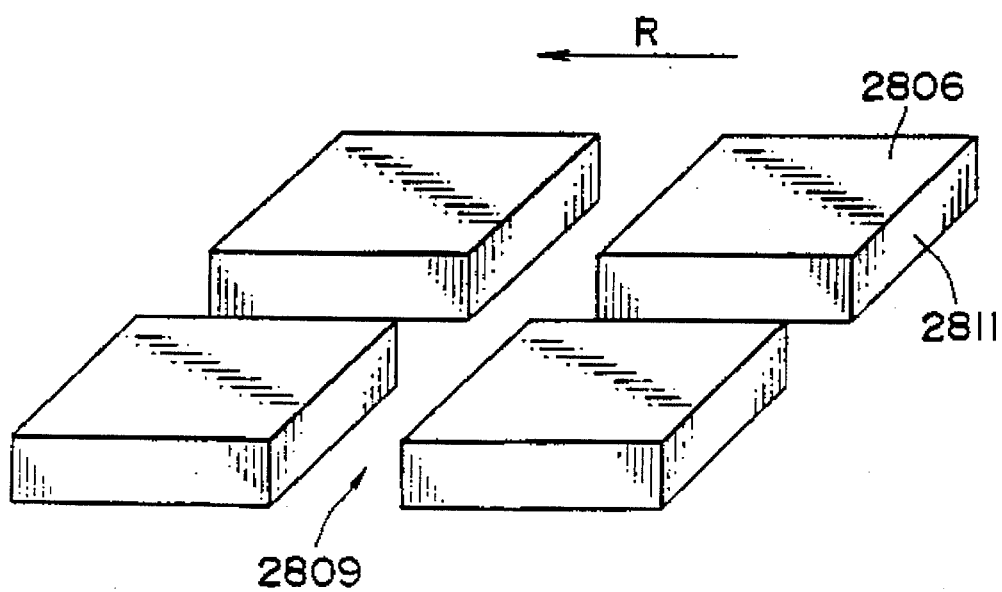
FIG. 29 is a typical perspective view of the device shown in FIG, 28.

FIG. 29 is a typical perspective view of the surface shape of a substrate 2801. As shown in the figure, since the separation recessed grooves 2809 are provided in a matrix on the surface of a planarization film, pixel electrodes 2806 are each positioned on the base portions 2811. Namely, since each pixel electrode 2806 projects from the surface of the substrate, the alignment treatment can be uniformly performed. Namely, it is possible to cover the surface of each pixel electrode 2806 forming the effective display domain with the alignment film made from polyimide or the like with a uniform thickness, and to uniformly perform the rubbing treatment.

A manufacturing method for the active-matrix liquid crystal display device shown in FIG. 28 will be described in detail with reference to FIGS. 30A to 30G. First, in a process of FIG. 30A, a polycrystalline silicon thin film (1 poly) 3002 is formed on the surface of an insulating substrate 3001 made from quartz by an LPCVD method. Next, the 1 poly 3002 is implanted with Si ions, followed by refinement once, and is subjected to solid-phase growth, for enlargement of the particle size. After that, the 1 poly 3002 is subjected to patterning to form a device region. Further, the surface of the 1 poly 3002 is thermally oxidized, to be converted into a $SiO_2$ 3003, to thus obtain a gate oxide film. Further, by implantation of boron ions with a specified concentration, the threshold voltage is previously adjusted. Next, in a process of FIG. 30B, a SiN 3004 is formed by the LPCVD method, to form a gate nitride film. The SiN 3004 is thermally oxidized, to be converted into a $SiO_2$ 3005. Thus, there can be obtained a gate insulating film composed of a three-layer structure of $SiO_2/SiN/SiO_2$ and being excellent in withstand pressure. Subsequently, another polycrystalline silicon thin film (2 poly) 3006 is deposited by the LPCVD method. After the 2 poly 3006 is reduced in its resistance, it is subjected to patterning into a specified shape, to thus obtain a gate electrode G. As ions are then implanted by self-alignment with the gate electrode G as a mask, to obtain the so-called LDD structure. Subsequently, SiN is partially removed by etching, As ions are implanted with a high concentration to provide a source region S and a drain region D on the 1 poly 3002. Thus, an N-channel thin film transistor (TFT) 3007 is formed. In a process of FIG. 30C, a first layer insulating film (1 PSG) 3008 is deposited by an APCVD method. A first contact hole (1 CON) 3010 is formed by patterning on the 1 PSG 3008, and then an aluminum (Al) 3009 is formed by sputtering over the surface. The Al 3009 is subjected to patterning in a specified shape, to form a metal bus line electrically connected to a source region S of the TFT.

Figure 30A:
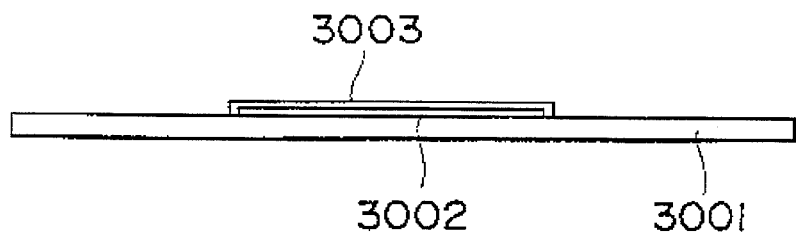
FIGS. 30A to 30G are manufacturing process diagrams for manufacturing a liquid crystal display device according to one embodiment of the present invention.
Figure 30B:
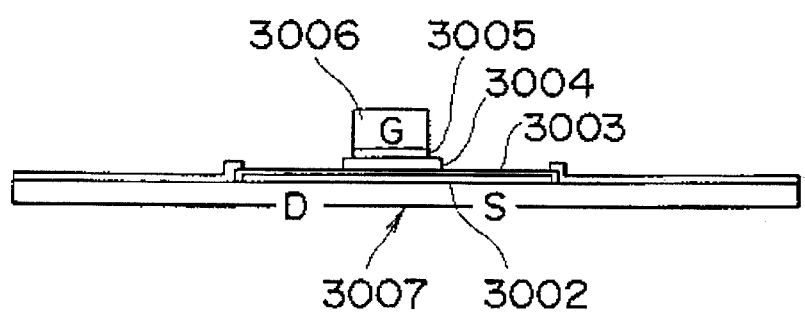
Figure 30C:
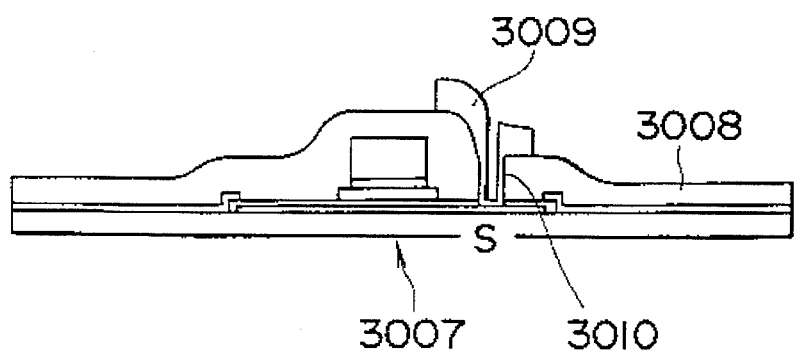
Figure 30D:
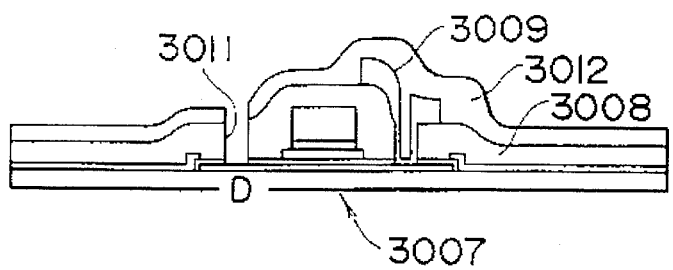
Figure 30E:
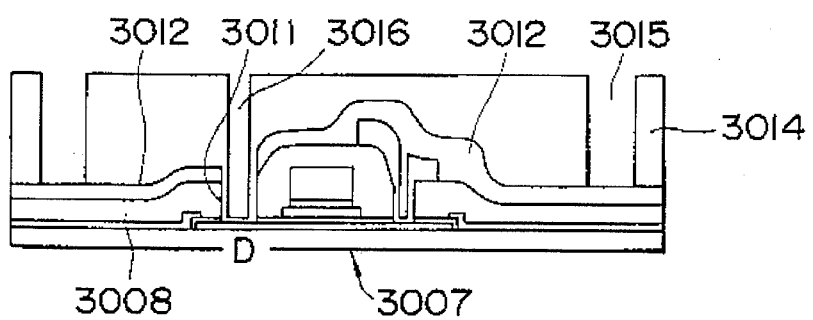
Figure 30F:
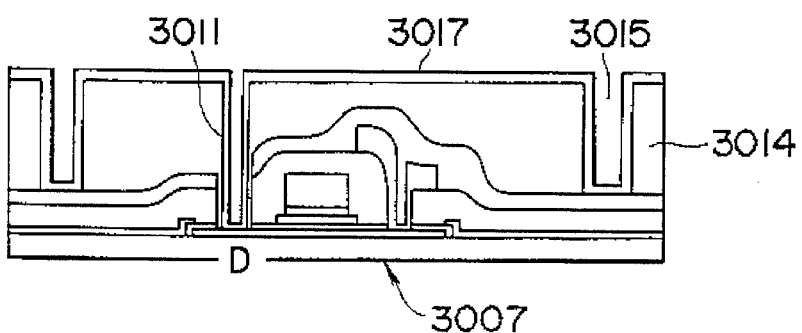
Figure 30G:
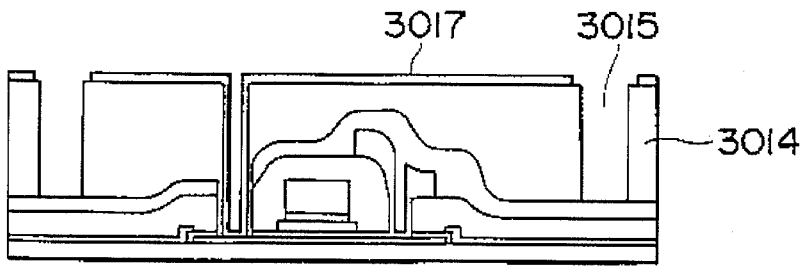

In a process of FIG. 30D, a 2 PSG 3012 is deposited on the 1 PSG 3001 by the APCVD method, to perfectly cover the metal bus line made from of the Al 3009. The 1 PSG 3001 and 2 PSG 3012 are then continuously etched, to form a second contact hole (2CON) 3011 communicated to a drain region D of the TFT 3007. In a process of FIG. 30E, the irregularities on the surface of the 2PSG 3012 are embedded by a planarization film 3014, which is carried out by coating a liquid acrylic resin having a specified viscosity by spin coating in this embodiment. After that, the acrylic resin is hardened by heating, to form a planarization film. The planarization film thus hardened is subjected to photolithography and etching, to form an aperture matched with the second contact hole (2CON) 3011. At this time, each separation recessed groove 3015 is simultaneously formed by etching along a specified pattern. In a process of FIG. 30F, a transparent conductive film is formed by sputtering. In this embodiment, an ITO 3017 is used as the transparent conductive film. The interior of the 2CON 3011 is filled with the ITO 3017, to be electrically connected to the drain region D of the TFT 3007. Finally, in a process of FIG. 30G, the ITO 3017 is subjected to a specified shape, to form pixel electrodes. As a result, individual pixel electrodes are surrounded by the separation recessed grooves. With the above processes, there can be obtained a drive substrate thus planarized for the active-matrix liquid crystal display device. After that, the drive substrate is connected to the facing substrate, being filled with a liquid crystal, to accomplish the active-matrix liquid crystal display device.

As described above, according to this embodiment, the individual pixel electrodes are formed on the planarized surface of the insulating layer. The separation recessed grooves are formed on the planarized surface along the surroundings of the individual pixel electrodes, so that the pretilt angles of the liquid crystal molecules are forcibly controlled, to separate the pixel electrodes from each other. Further since, the pixel electrodes thus separated are positioned on the base portions of the planarized surface, it is possible to uniformly perform the alignment treatment.

Next, the other embodiment relating to the above embodiment will be described.

Figure 31:
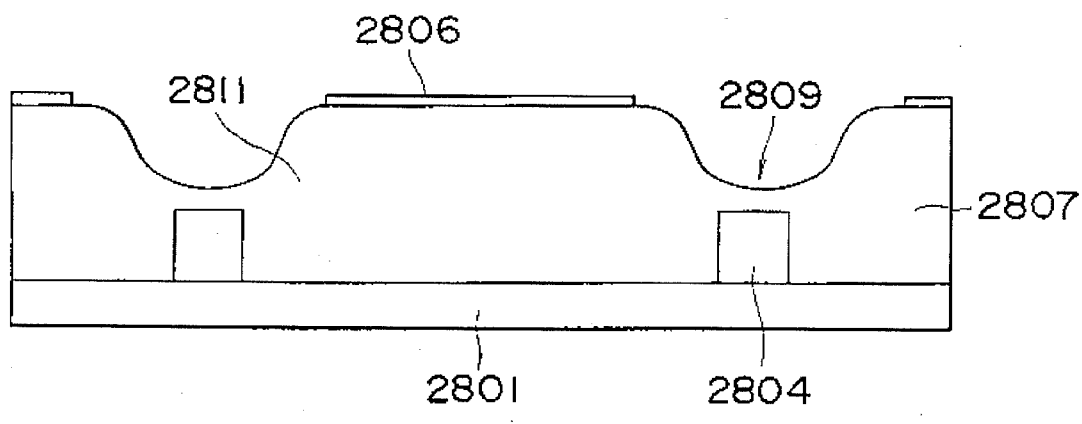
FIG. 31 is a typical partial sectional view of an active-matrix liquid crystal display device according to another embodiment of the present invention.

FIG. 31 is a typical sectional view showing an active-matrix liquid crystal display device according to this embodiment. This embodiment has a structure which is basically the same as that of the embodiment shown in FIG. 28, and corresponding parts are indicated by the corresponding reference numerals. In addition, for simplification of the drawing, the other substrate side is omitted. In this embodiment, a layer insulating film 2807 for covering bus lines 2804 and thin film transistors (not shown) is deposited to be sufficiently thick, to obtain a planarization structure. Namely, the layer insulating film 2807 has a thickness sufficiently thicker than the stepped portion dimension of the bus line 2804 or the like, to perfectly embed the irregularities on the surface of the substrate 2801. With this construction, separation recessed grooves 2809 are formed on the flat surface of the layer insulating film 2807 along the surroundings of the individual pixel electrodes 2806, to functionally separate the adjacent pixel electrodes from each other.

Figure 32:
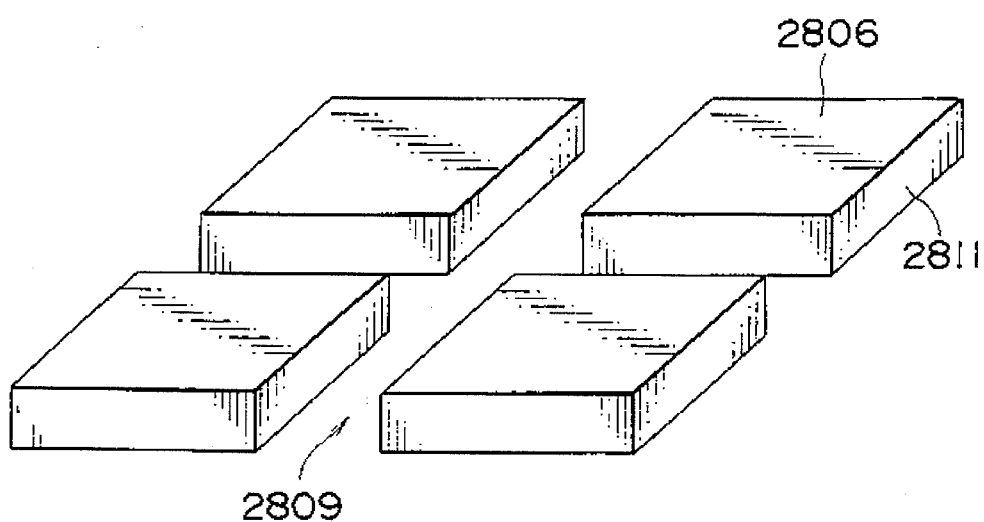
FIG. 32 is a typical perspective view of the device shown in FIG. 31.

FIG. 32 is a typical perspective view of the surface shape of the substrate according to the embodiment shown in FIG. 31. Similarly to the above embodiment, a layer insulating film is partitioned by separation recessed grooves 2809, and pixel electrodes 2806 each project from the base portion 2811. Accordingly, it is possible to uniformly perform the alignment treatment.

Figure 33A:
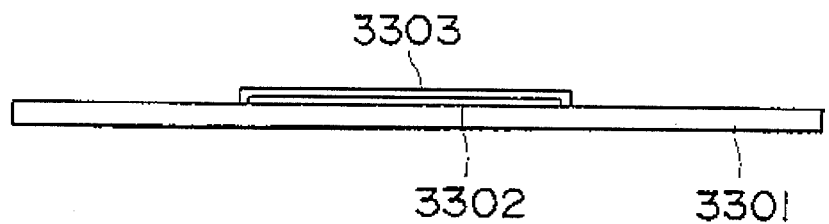
FIGS. 33A to 33F are manufacturing process diagrams for manufacturing the device of the embodiment shown in FIG. 31.
Figure 33B:
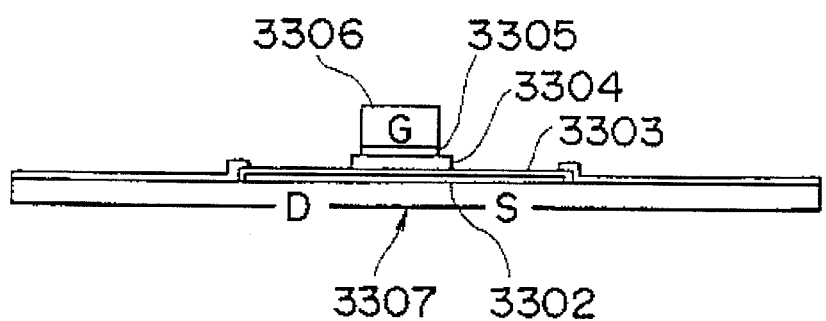
Figure 33C:
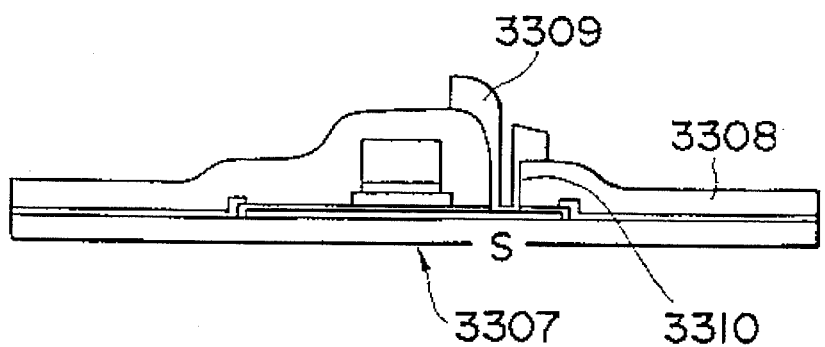
Figure 33D:
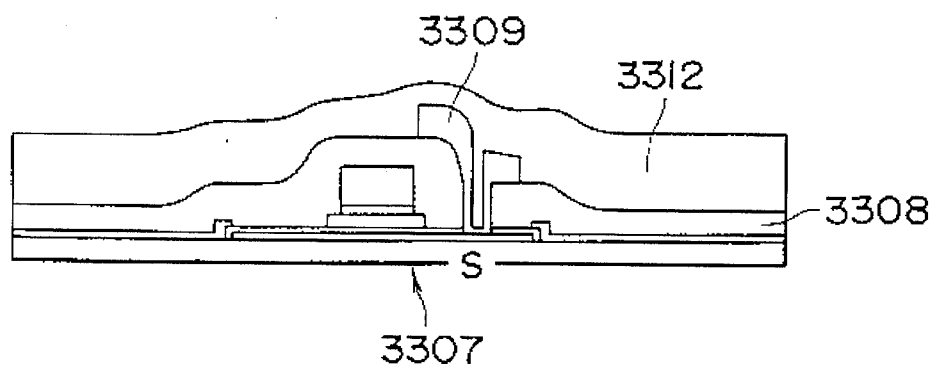
Figure 33E:
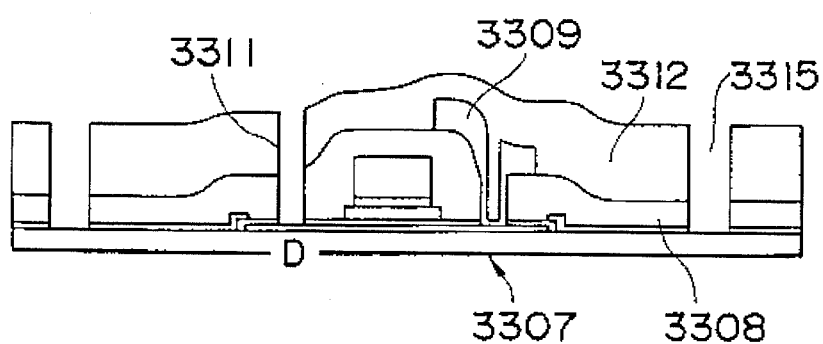
Figure 33F:
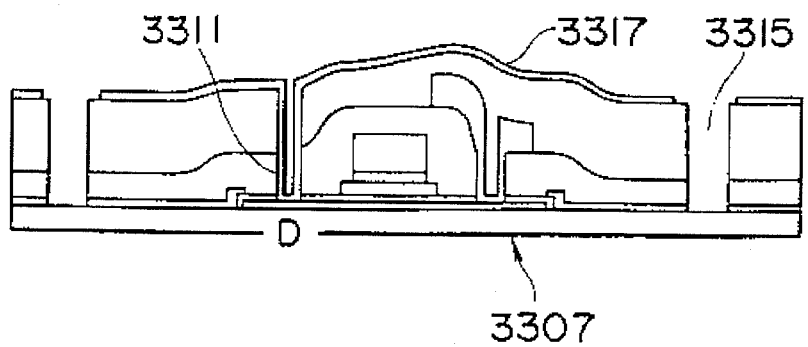

Next, a method of manufacturing the active-matrix liquid crystal display device of the embodiment shown in FIG. 31 will be described with reference to FIGS. 33A to 33F. FIGS. 33A, 33B and 33C show the processes until the step of including a metal bus line patterning. After that, in FIG. 33D, a 2 PSG 3312 is deposited to be overlapped on a 1 PSG 3308 by an APCVD method, to perfectly cover a metal bus line made from an Al 3309. At this time, the thickness of the 2 PSG 3312 is set to be larger than that in the prior art, to substantially absorb the stepped portions of the TFTs 3307 and the metal bus lines, thus substantially planarizing the surface. In a process E in FIG. 33E, the 1 PSG 3308 and 2 PSG 3312 are subjected to photolithography and etching, to form a 2CON 3311. A drain region D of the TFT 3307 is exposed from the bottom portion of the 2CON 3311. At this time, the separation recessed grooves 3315 are simultaneously formed by etching. Finally, in a process F in FIG. 33F, an ITO film 3317 is formed by sputtering. The interior of the 2CON 3311 is filled with the ITO 3317, to be electrically connected to the drain region D of the TFT 3307. After that, the ITO 3317 is subjected to patterning into a specified shape, to form pixel electrodes. As a result, the pixel electrodes are surrounded by the separation recessed grooves, which makes it possible to effectively separate the pixel electrodes from each other.

Next, another embodiment will be described.

Figure 34:
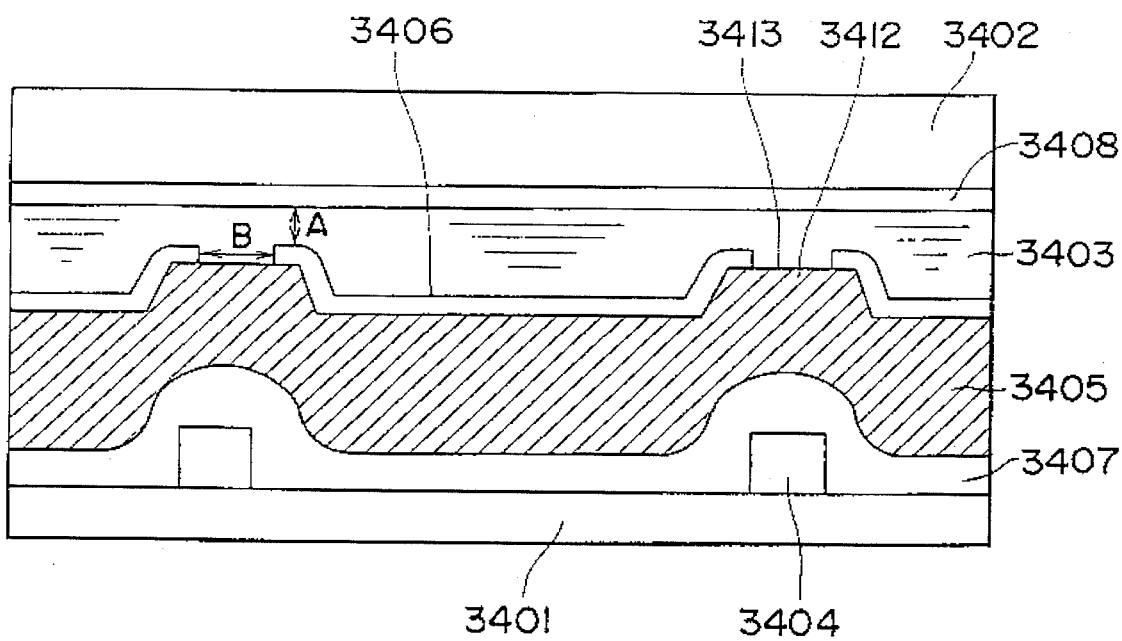
FIG. 34 is a typical partial sectional view of an active-matrix liquid crystal display device of a further embodiment of the present invention.
Figure 35A:
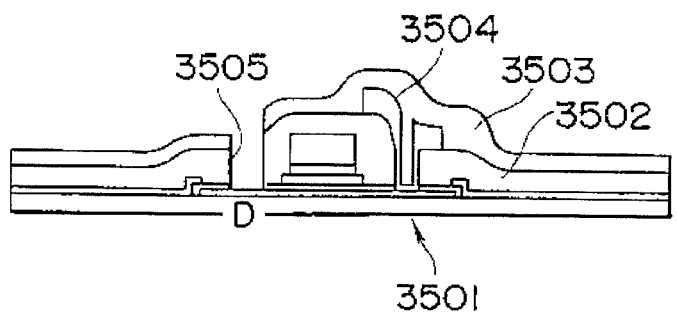
FIGS. 35A to 35D are manufacturing process diagrams for manufacturing the device of the embodiment shown in FIG. 34.
Figure 35B:
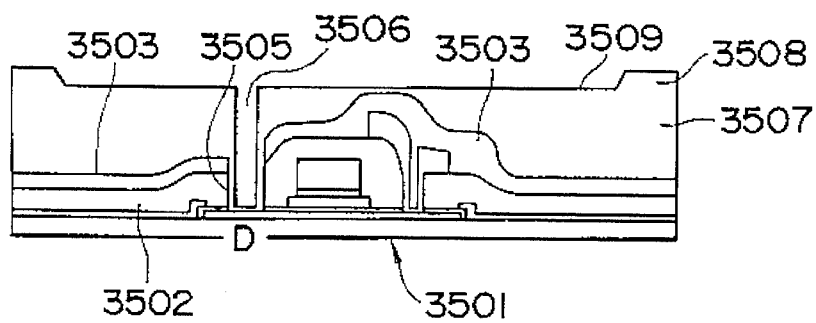
Figure 35C:
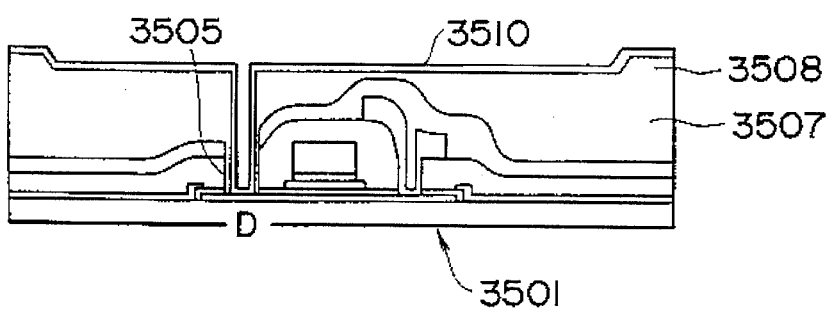
Figure 35D:
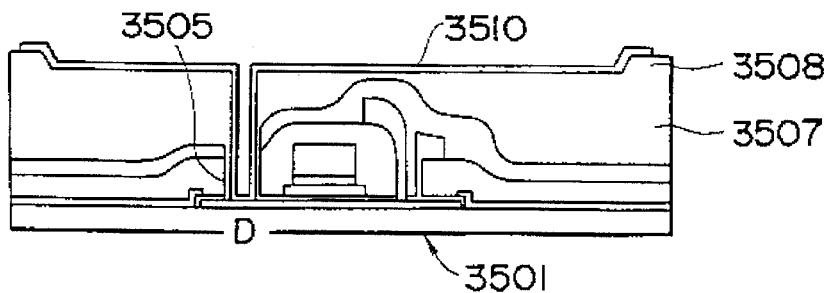

FIG. 34 is a typical sectional view of an active-matrix liquid crystal display device of this embodiment. One substrate 3401 includes a region where thin film transistors (not shown) and bus lines 3404 are formed; an insulating film 3405 formed on the above region; and pixel electrodes 3406 arranged in a matrix on the insulating film 3405. The other substrate 3402 includes a facing electrode 3408, to constitute liquid crystal pixels between the individual pixel electrodes 3406 and the same. This embodiment has a feature in that separating projections 3412 are formed along the intervals between the adjacent pixel electrodes 3406. The end portion of each pixel electrode 3406 extends so as to be overlapped on the vortex portion 3413 of the separating projection 3412, to functionally separate the adjacent liquid crystal pixels from each other. In this embodiment, the insulating layer 3405 is a planarization film made form a resin material, and the flat surface thereof is etched in a matrix and the residual portion is made in the separating projections 3412. With this construction, a distance A between the end portion of the pixel electrode 3406 and the facing electrode 3408 can be smaller than a distance B between the end portions of the adjacent pixel electrodes 3406. Accordingly, in the boundary region of each liquid crystal pixel, the normal vertical electric field is enlarged more than the subsidiary lateral electric field, so that the liquid crystal pixels can be effectively separated from each other.

FIGS. 35A to 35D are process diagrams showing a method of manufacturing an active-matrix liquid crystal display device of the embodiment shown in FIG. 34. In a process of FIG. 35A, a 2CON 3505 communicated to a drain region D of a TFT 3501 is formed. The processes to this step are the same as those until the process D of FIG. 30. Subsequently, in a process of FIG. 35B, the irregularities on the surface of the 2 PSG 3503 are embedded by a planarization film 3507, specifically, by spin coating of a liquid acrylic resin having a specified viscosity in this embodiment. After that, the acrylic resin is hardened by heating to form a planarization film. The planarization film 3507 thus hardened is subjected to photolithography and etching, to form recessed flat portions 3509 in a matrix. The residual portion of the planarization film 3509 left by this flattening is made as the separating projections 3508. Subsequently, the planarization film 3507 is partially etched, to form an aperture 3506 matched with the 2CON 3505. In a process of FIG. 35C, an ITO 3510 is formed over the whole surface by sputtering. The interior of the 2CON 3505 is filled with the ITO 3510, to be electrically connected to the drain region D of the TFT 3501. Finally, in a process of FIG. 35D, the ITO 3510 is subjected to patterning in a specified shape, to form pixel electrodes. At this time, the end portion of each pixel electrode extends so as to be overlapped on the vortex portion of the separating projection 3508, to effectively separate the adjacent pixel electrodes from each other.

Figure 36:
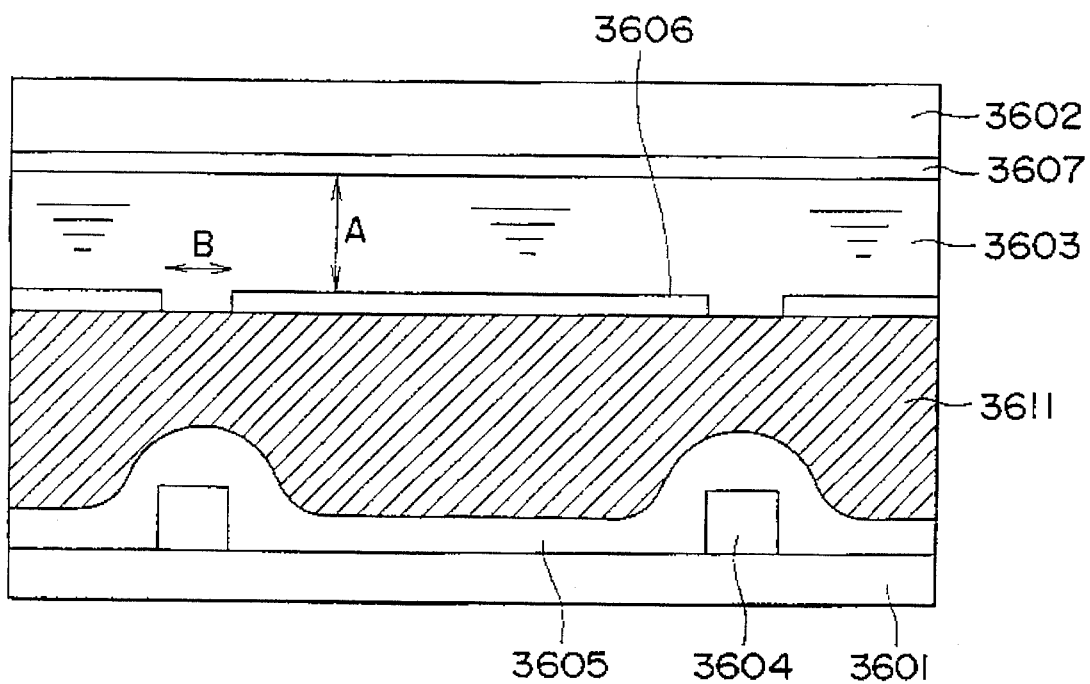
FIG. 36 is a sectional view of an active-matrix liquid crystal display device of the present invention.

In addition, for reference, the construction using only a planarization film without any separation projection will be described in FIG. 36.

A lower substrate 3610 includes a region where thin film transistors (not shown) and bus lines 3604 are formed, and a planarization layer 3611 formed on the above region. The planarization film 3611 is has a substantially perfect flat surface, on which pixel electrodes 3606 are formed in a matrix. Accordingly, it is possible to uniformly perform the rubbing treatment for the pixel electrodes 3606. Further, since the pixel electrodes 3606 can be formed by patterning without any influence of the irregularities on the lower region, and hence to achieve the fine structure. However, along with the reducing the size, there is often generated such a case that an interval B between the adjacent pixel electrodes 3606 is made smaller than the thickness A of the liquid crystal layer 3603. At this time, the subsidiary lateral electric field generated between the adjacent pixel electrode 3606 is enlarged more than the normal vertical electric field applied between the pixel electrode 3606 and the facing electrode 3607, which causes a disadvantage in deteriorating the normal image display. In other words, along with the adoption of the planarization technique, it is difficult to separate the individual pixel electrodes from each other. This causes a disadvantage in obstructing the high accuracy and the high fineness of the active-matrix liquid crystal display device.

As described above, according to the preferred embodiment wherein the separation recessed grooves are formed on the flat surface of the insulating layer along the surroundings of the individual pixel electrodes, it is possible to forcibly control a pretilt angle of the liquid crystal molecules, and hence to functionally separate the adjacent liquid crystal pixels from each other. Alternatively, by a method wherein the separating projections are formed along the intervals between the adjacent pixel electrodes and the end portion of each pixel electrode extends so as to be overlapped on the vortex of the separating projection, the intensity of the vertical electric field is enhanced, to functionally separate the adjacent pixel electrodes from each other. By adoption of the above separation recessed grooves and the separating projections, it is possible to realize the high accuracy and the high fineness of the active-matrix liquid crystal display device. In particular, in the case that the individual pixel electrodes are separated from each other by the separation recessed grooves, since the surfaces thereof project from the substrate, the alignment treatment can be uniformly performed.

Further, there will be described an embodiment wherein a lateral electric field applied between upper and lower electrodes of the active-matrix liquid crystal display device is equalized so as to suppress the variation in the reverse tilt domains.

Figure 37:
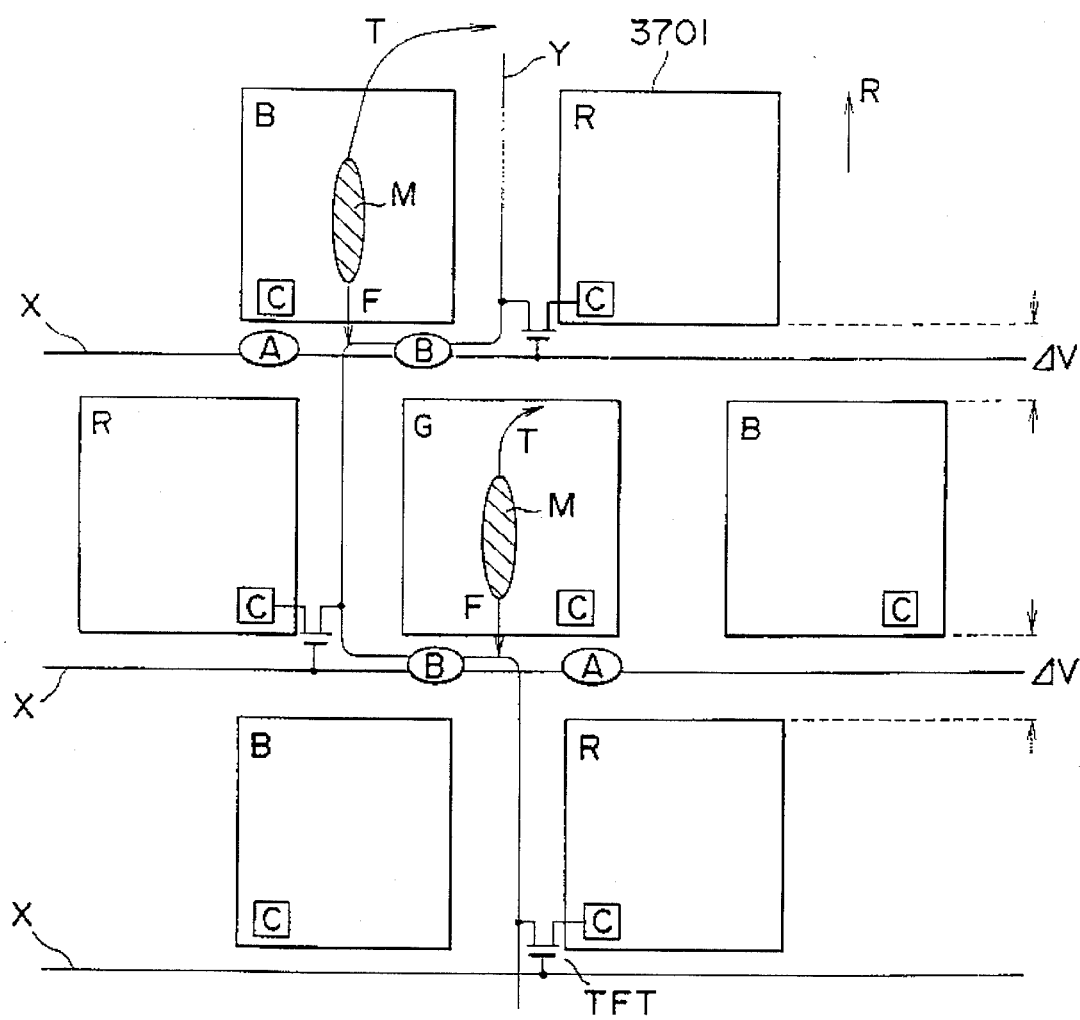
FIG. 37 is a typical plan view showing an active-matrix liquid crystal display device according to one embodiment of the present invention.
Figure 38:
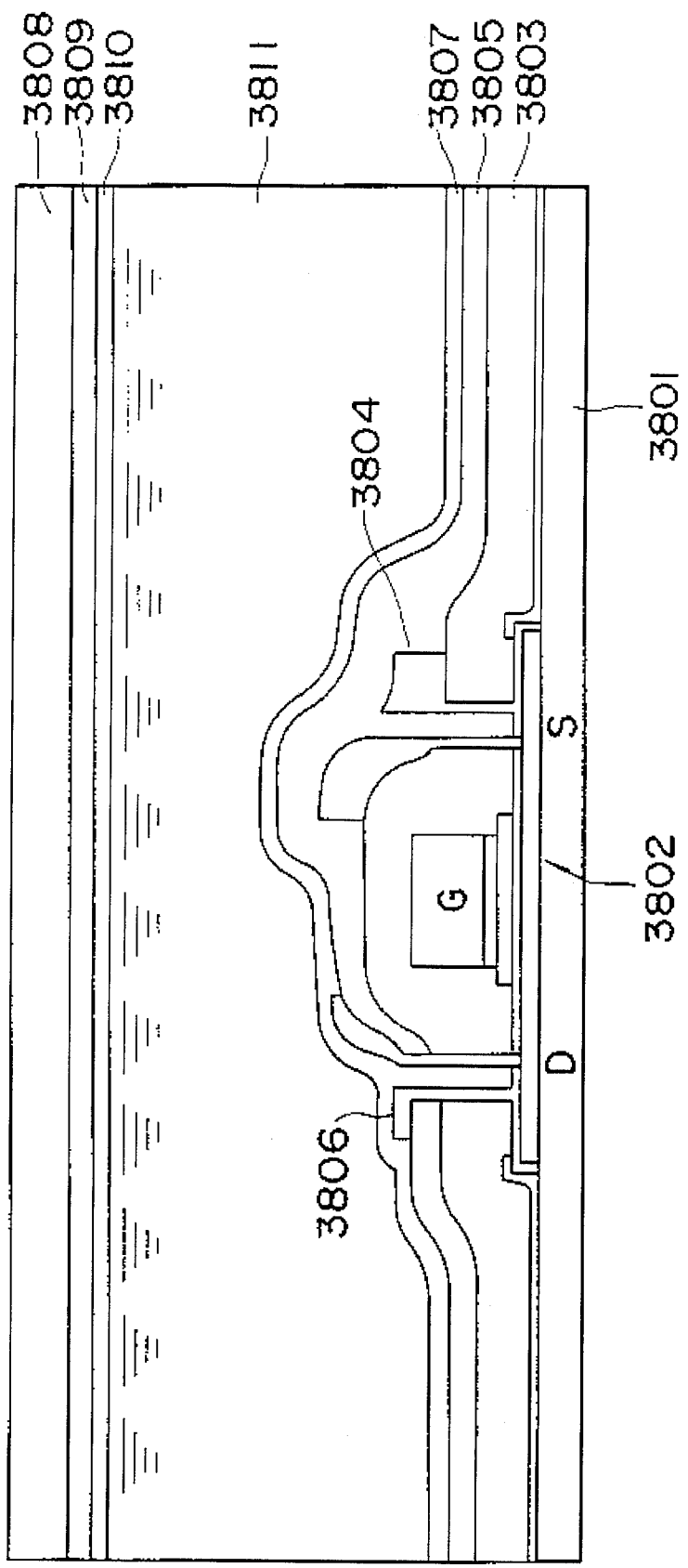
FIG. 38 is a sectional view showing a general example of a prior art active-matrix substrate.
Figure 39:
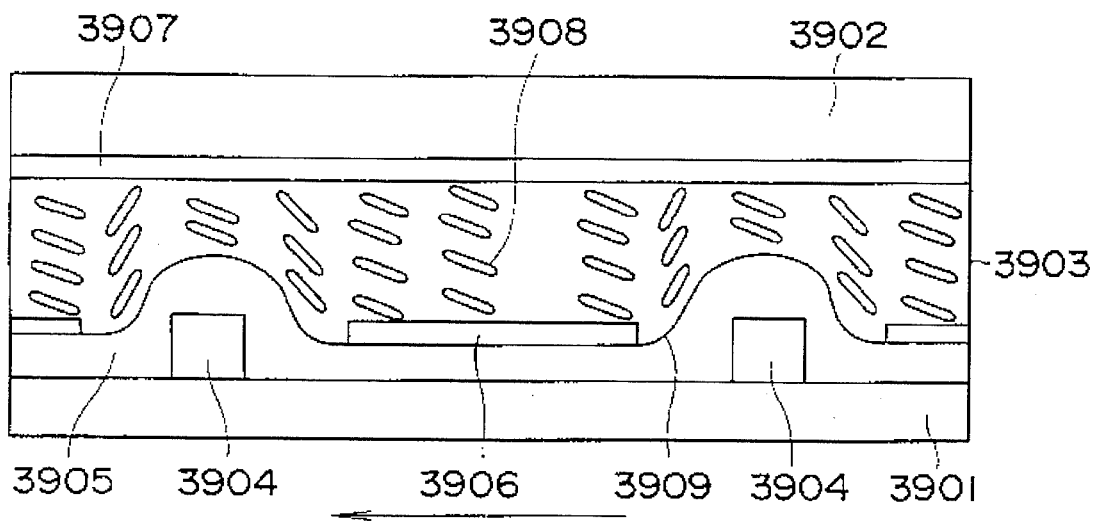
FIG. 39 is a typical sectional view showing the construction of a prior art active-matrix liquid crystal display device.
Figure 40:
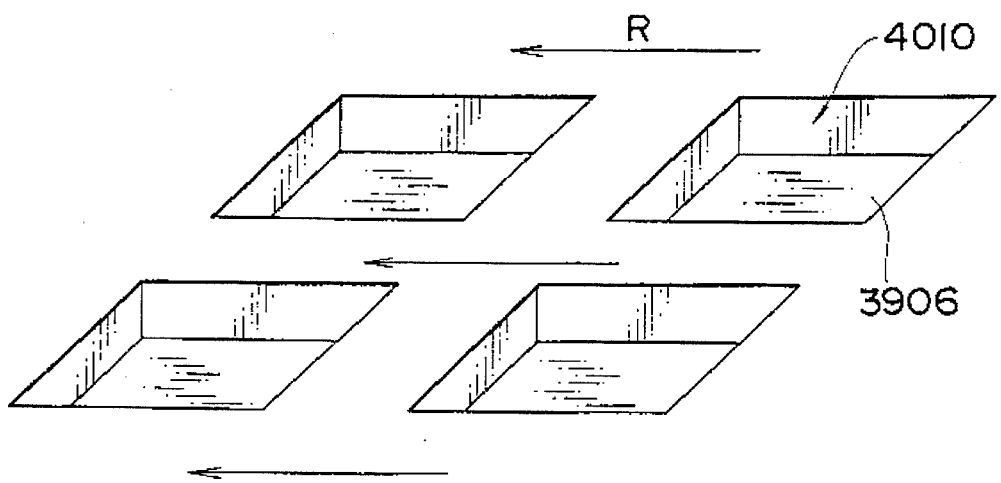
FIG. 40 is a typical perspective view of a prior art active-matrix liquid crystal display device.
Figure 41:
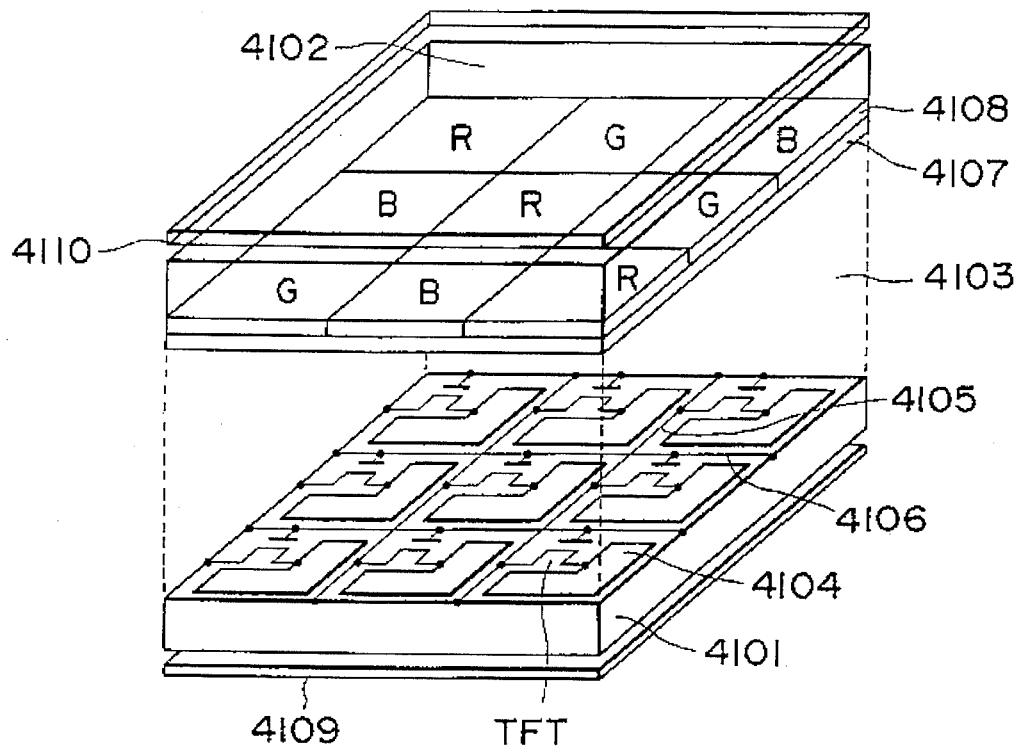
FIG. 41 is a perspective view of a general construction of a prior art active-matrix liquid crystal display device.
Figure 42:
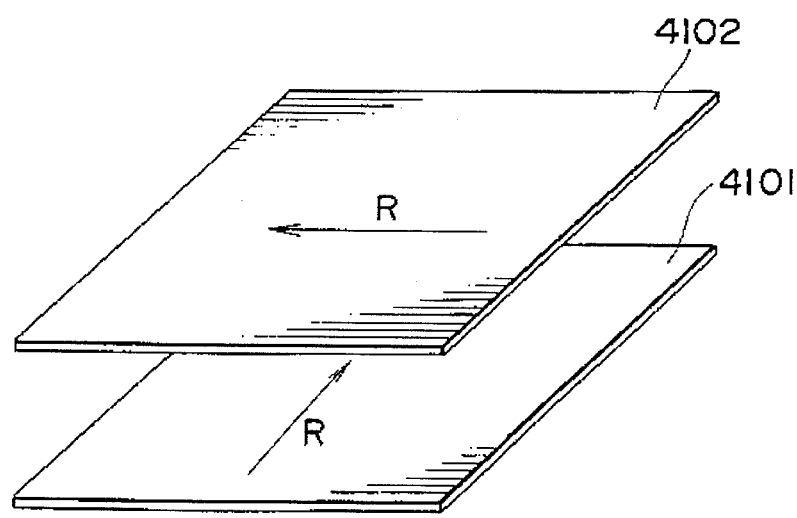
FIG. 42 is a typical view showing a rubbing treatment.
Figure 43:
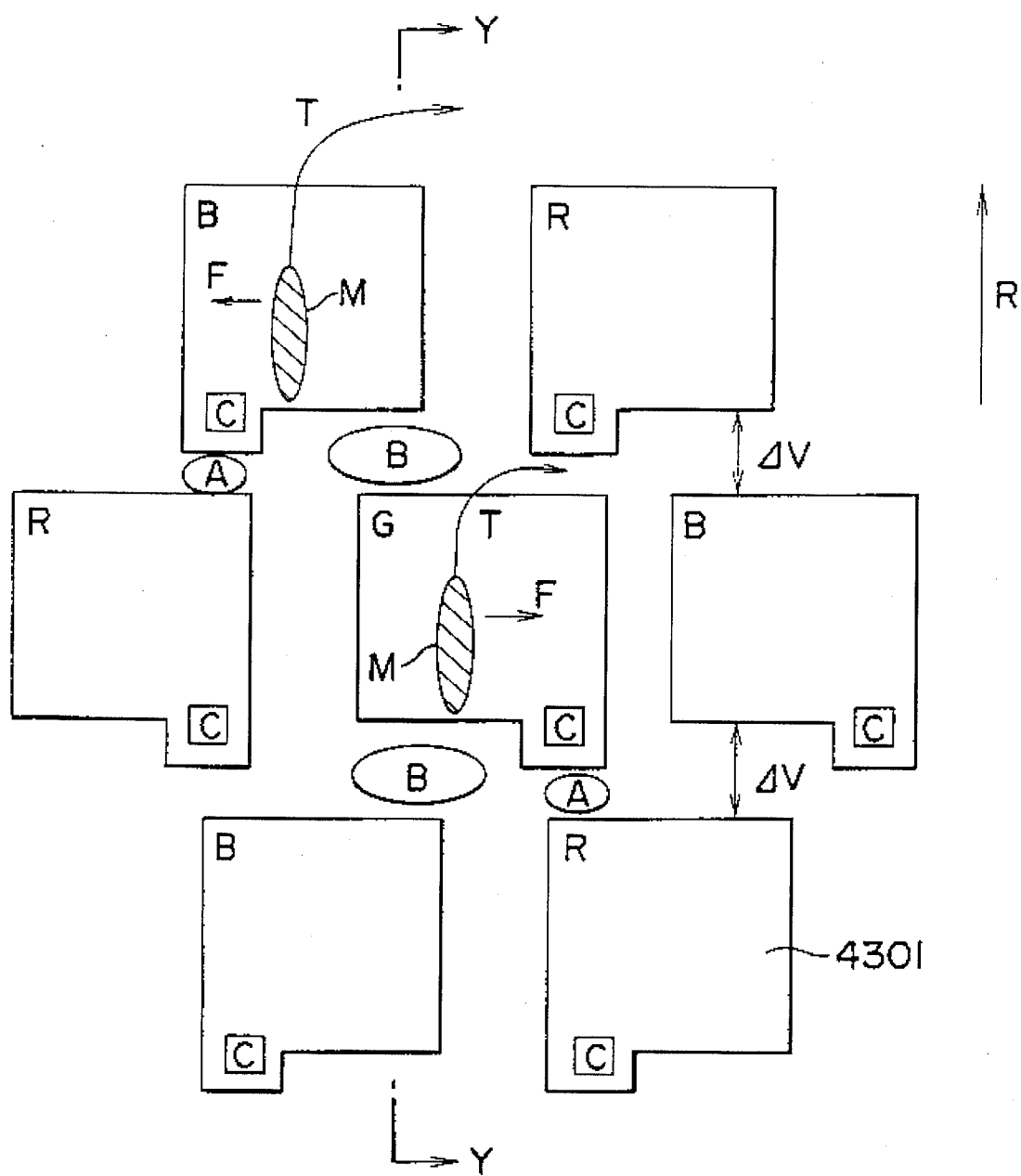
FIG. 43 is a typical plan view showing a shape and an arrangement of each pixel electrode of a prior art active-matrix liquid crystal display device.
Figure 44:
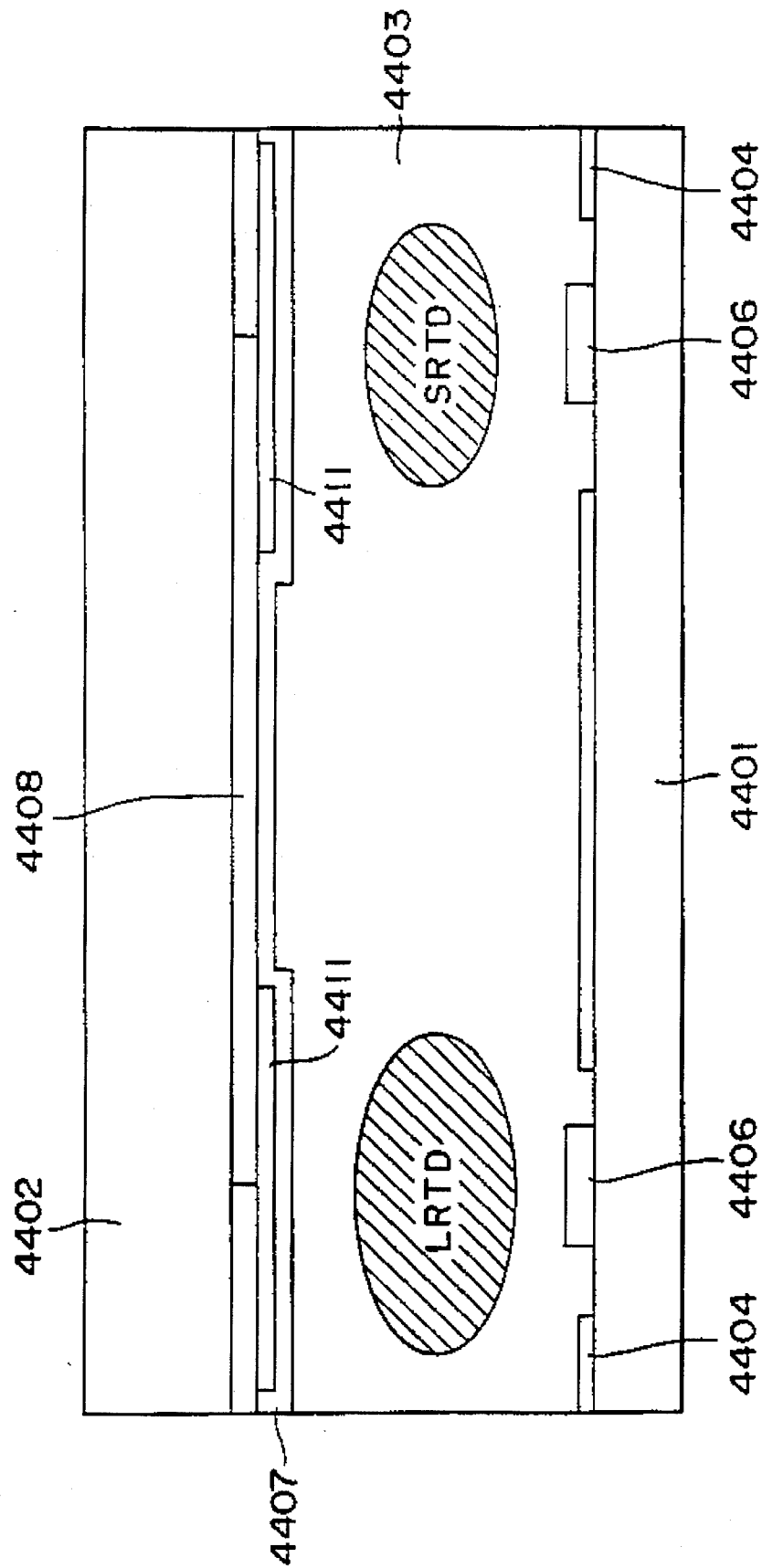
FIG. 44 is a view for explaining the problem of a prior art active-matrix liquid crystal display device.

The preferred embodiment will be described in detail with reference to the drawings. FIG. 37 is a typical plan view showing the construction of an active-matrix liquid crystal display device according to the present invention. The active-matrix liquid crystal display device has a cell structure including a TFT substrate and a facing substrate which are disposed to face each other with an interval, and a liquid crystal layer is held in the above interval. As shown in the figure, on the surface of the TFT substrate, there are provided pixel electrodes 3701 arranged in a matrix in the vertical and lateral directions, and switching devices connected to the individual pixel electrodes 3701. In this embodiment, the switching devices are formed of TFTs. The other substrate (not shown) includes a facing electrode, and a vertical electric field is applied in a liquid crystal layer (not shown) between each pixel electrode 3701 and the same. In addition, the vertical electric field is applied in the vertical direction with respect to the paper surface. In this embodiment, the color display is performed, wherein the principle colors, that is, red R, blue B and green G are divided in the individual pixel electrodes. The pixel electrodes with the principle colors are disposed in a triangular shape, that is, in the so-called a delta-arrangement. A drain electrode of the TFT is connected to the corresponding pixel electrode 3701 through a contact C. A source electrode of the TFT is connected to the corresponding signal line Y. A gate electrode of the TFT is connected to the corresponding gate line X. The TFT in each line is vertically selected in a line sequential manner through the gate line X, and the TFT in each row is supplied with an image signal through the signal electrode Y, to thus perform the desired full color image display. In this embodiment, the so-called 1H reverse drive is performed, so that the polarity of the image signal voltage written in each pixel electrode 3701 is reversed for each line. Accordingly, a large potential difference $\Delta V$ is generated between the adjacent upper and lower pixel electrodes 3701. The potential difference $\Delta V$ reaches the value being twice as much as the maximum image signal voltage.

This embodiment has a feature in that the individual pixel electrodes 3701 have each a symmetrical shape in the right and left, to equalize the lateral electric field generated between the pixel electrodes 3701 vertically spaced from each other. In addition, the lateral electric field is in parallel to the paper surface. As shown in the figure, the lateral electric field has the substantially equal intensity in the left region A and the right region B. Accordingly, a force F applied to the liquid crystal molecules M by the lateral electric field is directed in the vertical direction. On the other hand, as shown in the figure, when the rubbing direction R of the TFT substrate is directed in the direction from the bottom to the top, and the rubbing direction of the facing substrate is directed in the direction from the right to the left, the rotational direction T of the liquid crystal molecules M is in the clockwise direction as seen from the facing substrate side. The force F generated by the lateral electric field does not exert unnecessary effect on the rotational direction T. Since the pixel electrode 3701 has the symmetric shape in the right and left, the force F is usually applied in the vertical direction for each line. Accordingly, the force F generated by the lateral electric field does not exert ununiform effect on the rotational direction T of the liquid crystal molecules M, so that the extension of the reverse tilt domain is made substantially constant for all lines. Consequently, as compared with the prior art, it is possible to reduce the dimension of the black mask for shielding the reverse tilt domain, and hence to improve the aperture ratio.

Such a shape of the pixel electrode is particularly effective for the structure where the TFT substrate is planarized, and the influences of the electric field due to the signal bus line and the gate line of the underlayer are eliminated.

By adoption of the planarization structure, the alignment film has an extremely flat surface, and has no stepped portion, so that the uniform rubbing treatment can be performed. Further, there exists no rising portion around the pixel electrodes. Accordingly, it is possible to perform the uniform alignment control over the whole screen. Further, the liquid crystal layer is perfectly controlled to be driven by the vertical electric field applied between the facing electrode and the pixel electrode, and is not affected by the lateral electric field resulting from the gate electrode G and the signal line Y. As a consequence, by combination with the pixel electrodes having a symmetrical shape in the right and left as described above, it is possible to effectively prevent the deterioration of the display quality due to the reverse tilt domain extremely.

As described above, according to this embodiment, the shape of the pixel electrode is made symmetric to the right and to left for preventing the unbalance of the lateral electric field intensity in the adjacent upper and lower pixel electrodes, which makes it possible to prevent applying of the force to the rotational direction of the liquid crystal molecules. This prevents the generation of the difference in magnitude between the reverse tile domains for lines even by the 1H drive. Accordingly, it is possible to reduce the dimension of the shading region such as a black mask as compared with the prior art, and hence to improve the aperture ratio of the pixel electrode. The above structure is particularly effective for the case that the TFT substrate is planarized and the influences of the electric field due to the signal line and the gate line of the underlayer are eliminated.

Although various minor changes and modifications might be proposed by those skilled in the art, it will be understood that our wish is to include within the claims of the patent warranted hereon all such changes and modifications as reasonably come within our contribution to the art.

What is claimed is:

1. An active-matrix substrate, comprising:

an upper region having a plurality of flat planar pixel electrodes arranged in a matrix:

a lower region having a plurality of thin film transistors, each of which is associated with each pixel electrode and wherein the flat planar pixel electrodes overlie respective thin film transistors;

a planarization layer arranged between the upper and lower regions to planarize a surface of the lower region and to provide a flat planar surface on which the flat planar pixel electrodes overlie the thin film transistors; and said planarization layer comprising a transparent resin film.

2. An active-matrix substrate as claimed in claim 1, further comprising a black mask formed at a boundary between adjacent pixel electrodes.

3. An active-matrix substrate as claimed in claim 1, further comprising a plurality of color filters, each of which is associated with a corresponding pixel electrode.

4. An active-matrix substrate as claimed in claim 3, wherein said color filters are formed only at a light transmissive region.

5. An active-matrix substrate as claimed in claim 4, wherein said planarization layer is formed on the light transmissive region.

6. An active-matrix substrate, comprising:

an upper region having a plurality of flat planar pixel electrodes arranged in a matrix:

a lower region having a plurality of thin film transistors, each of which is associated with each pixel electrode and wherein the flat planar pixel electrodes overlie respective thin film transistors;

a planarization layer arranged between the upper and lower regions to planarize a surface of the lower region and to provide a flat planar surface on which the flat planar pixel electrodes overlie the thin film transistors;

a black mask formed at a boundary between adjacent pixel electrodes; and said black mask comprising a bus line formed at the lower region.

7. An active-matrix substrate, comprising:

an upper region having a plurality of pixel electrodes arranged in a matrix:

a lower region having a plurality of thin film transistors, each of which is associated with each pixel electrode;

a planarization layer arranged between the upper and lower regions to planarize a surface of the lower region;

a plurality of color filters, each of which is associated with a corresponding pixel electrode; and said color filters being comprised of the planarization layer.

8. An active-matrix liquid crystal display device, comprising:

first and second substrates arranged in parallel to each other;

said first substrate comprising an upper region which has a plurality of flat planar pixel electrodes arranged in a matrix, a lower region which has a plurality of thin film transistors, each of which is associated with and underlies each pixel electrode, and a planarization layer arranged between the upper and lower regions to planarize a surface of the lower region and to provide a flat planar surface on which the flat planar pixel electrodes overlie the respective thin film transistors;

a liquid crystal layer formed between the first and second substrates; and a distance between said adjacent pixel electrodes being larger than a thickness of the liquid crystal layer.

9. An active-matrix liquid crystal display device as claimed in claim 8, further comprising a separating means for separating adjacent pixel electrodes from each other.

10. An active-matrix liquid crystal display device as claimed in claim 9, wherein said separating means comprises a groove surrounding the pixel electrode.

11. An active-matrix liquid crystal display device as claimed in claim 8, wherein each of said pixel electrodes has a symmetrical shape so that a lateral electric field caused between adjacent pixel electrodes in a vertical direction of the matrix is homogenized.

12. An active-matrix liquid crystal display device comprising:

first and second substrates arranged in parallel to each other;

said first substrate comprising an upper region which has a plurality of pixel electrodes arranged in a matrix, a lower region which has a plurality of thin film transistors, each of which is associated with each pixel electrode, and a planarization layer arranged between the upper and lower regions to planarize a surface of the lower region;

a liquid crystal layer formed between the first and second substrates;

a separating means for separating adjacent pixel electrodes from each other;

said separating means comprising a groove surrounding the pixel electrode; and said groove being formed at the planarization layer.

13. A method of manufacturing an active-matrix substrate, comprising the steps of:

forming a first region which has a plurality of thin film transistors formed on a substrate;

planarizing an uneven surface of the first region by applying a liquid transparent resin and then hardening the resin to form a planarization layer to provide a flat planar surface overlying the thin film transistors; and forming a second region which has a plurality of flat planar pixel electrodes on the flat planar surface of the planarization layer overlying the respective thin film transistors.

14. A method as claimed in claim 13, further comprising a contacting step for electrically contacting the pixel electrode with the corresponding thin film transistor through a contact hole.

15. A method of manufacturing an active-matrix substrate, comprising the steps of:

forming a first region which has a plurality of thin film transistors formed on a substrate;

planarizing an uneven surface of the first region by a planarization layer to provide a flat planar surface overlying the thin film transistors;

forming a second region which has a plurality of flat planar pixel electrodes on the flat planar surface of the planarization layer overlying the respective thin film transistors;

in a contacting step, electrically contacting the pixel electrode with the corresponding thin film transistor through a contact hole; after applying a photolithography and etching the planarization layer comprised of a photosensitive resin to form the contact hole.

* * * * *